(12) United States Patent
Perez et al.

(10) Patent No.: US 9,202,443 B2
(45) Date of Patent: Dec. 1, 2015

(54) IMPROVING DISPLAY PERFORMANCE WITH IRIS SCAN PROFILING

(71) Applicant: Microsoft Technology Licensing, LLC, Redmond, WA (US)

(72) Inventors: Kathryn Stone Perez, Kirkland, WA (US); Bob Crocco, Jr., Seattle, WA (US); John R. Lewis, Bellevue, WA (US); Ben Vaught, Seattle, WA (US); Alex Aben-Athar Kipman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 13/689,542

(22) Filed: Nov. 29, 2012

(65) Prior Publication Data

US 2013/0169683 A1    Jul. 4, 2013

Related U.S. Application Data

(63) Continuation of application No. 13/221,669, filed on Aug. 30, 2011, now abandoned.

(51) Int. Cl.
G09G 5/377 (2006.01)
G02B 27/02 (2006.01)
G06K 9/46 (2006.01)
G06K 9/00 (2006.01)
G06F 3/01 (2006.01)

(52) U.S. Cl.
CPC ............... *G09G 5/377* (2013.01); *G02B 27/02* (2013.01); *G06F 3/011* (2013.01); *G06K 9/00597* (2013.01); *G06K 9/46* (2013.01); *G06F 2203/011* (2013.01)

(58) Field of Classification Search
None
See application file for complete search history.

(56) References Cited

U.S. PATENT DOCUMENTS

| 4,634,384 A | 1/1987 | Neves et al. |
| 5,016,282 A | 5/1991 | Tomono et al. |

(Continued)

FOREIGN PATENT DOCUMENTS

| CA | 2685976 A1 | 11/2008 |
| CN | 101542584A A | 9/2009 |

(Continued)

OTHER PUBLICATIONS

Final Office Action dated Dec. 23, 2013, U.S. Appl. No. 13/941,439, filed Jul. 12, 2013.

(Continued)

*Primary Examiner* — Stephen R Koziol
*Assistant Examiner* — Jason Pringle-Parker
(74) *Attorney, Agent, or Firm* — Dan Choi; Judy Yee; Micky Minhas

(57) ABSTRACT

A see-through head mounted-display and method for operating the display to optimize performance of the display by referencing a user profile automatically. The identity of the user is determined by performing an iris scan and recognition of a user enabling user profile information to be retrieved and used to enhance the user's experience with the see through head mounted display. The user profile may contain user preferences regarding services providing augmented reality images to the see-through head-mounted display, as well as display adjustment information optimizing the position of display elements in the see-though head-mounted display.

20 Claims, 18 Drawing Sheets

(56) References Cited

U.S. PATENT DOCUMENTS

| | | | |
|---|---|---|---|
| 5,471,542 A | | 11/1995 | Ragland |
| 5,539,422 A | * | 7/1996 | Heacock et al. ............... 345/8 |
| 5,557,364 A | | 9/1996 | Shindo et al. |
| 5,572,361 A | * | 11/1996 | Kamiya et al. ............ 359/426 |
| 5,689,619 A | | 11/1997 | Smyth |
| 5,708,449 A | | 1/1998 | Heacock et al. |
| 5,815,126 A | * | 9/1998 | Fan et al. ....................... 345/8 |
| 5,861,940 A | | 1/1999 | Robinson et al. |
| 6,034,653 A | | 3/2000 | Robertson et al. |
| 6,055,110 A | | 4/2000 | Kintz et al. |
| 6,069,608 A | | 5/2000 | Izumi et al. |
| 6,151,061 A | | 11/2000 | Tokuhashi |
| 6,154,321 A | | 11/2000 | Melville et al. |
| 6,351,335 B1 | | 2/2002 | Perlin |
| 6,396,461 B1 | | 5/2002 | Lewis et al. |
| 6,433,760 B1 | | 8/2002 | Vaissie et al. |
| 6,456,262 B1 | | 9/2002 | Bell |
| 6,480,174 B1 | * | 11/2002 | Kaufmann et al. ............. 345/8 |
| 6,518,939 B1 | * | 2/2003 | Kikuchi ....................... 345/8 |
| 6,545,650 B1 | | 4/2003 | Yamada et al. |
| 6,578,962 B1 | | 6/2003 | Amir et al. |
| 6,659,611 B2 | | 12/2003 | Amir et al. |
| 6,864,910 B1 | | 3/2005 | Ogino et al. |
| 6,886,137 B2 | | 4/2005 | Peck et al. |
| 6,943,754 B2 | | 9/2005 | Aughey et al. |
| 7,130,447 B2 | | 10/2006 | Aughey et al. |
| 7,193,584 B2 | | 3/2007 | Lee |
| 7,193,585 B2 | | 3/2007 | Takagi |
| 7,229,174 B2 | | 6/2007 | Hakkinen |
| 7,391,887 B2 | | 6/2008 | Durnell |
| 7,396,129 B2 | | 7/2008 | Endrikhovski et al. |
| 7,401,920 B1 | * | 7/2008 | Kranz et al. .............. 351/210 |
| 7,457,434 B2 | | 11/2008 | Azar |
| 7,522,344 B1 | | 4/2009 | Curatu et al. |
| 7,532,230 B2 | | 5/2009 | Culbertson et al. |
| 7,533,988 B2 | | 5/2009 | Ebisawa |
| 7,538,744 B1 | | 5/2009 | Liu et al. |
| 7,542,210 B2 | | 6/2009 | Chirieleison, Sr. |
| 7,573,525 B2 | | 8/2009 | Yamasaki |
| 7,618,144 B2 | | 11/2009 | Hutchin |
| 7,686,451 B2 | | 3/2010 | Cleveland |
| 7,736,000 B2 | | 6/2010 | Enriquez et al. |
| 7,804,507 B2 | * | 9/2010 | Yang et al. ................. 345/633 |
| 7,809,160 B2 | | 10/2010 | Vertegaal et al. |
| 7,883,415 B2 | | 2/2011 | Larsen et al. |
| 8,487,838 B2 | | 7/2013 | Lewis et al. |
| 2002/0105482 A1 | | 8/2002 | Lemelson et al. |
| 2002/0113755 A1 | | 8/2002 | Lee |
| 2002/0163486 A1 | * | 11/2002 | Ronzani et al. ............... 345/87 |
| 2002/0167462 A1 | | 11/2002 | Lewis et al. |
| 2004/0238732 A1 | | 12/2004 | State et al. |
| 2005/0047629 A1 | | 3/2005 | Farrell et al. |
| 2005/0190180 A1 | | 9/2005 | Jin et al. |
| 2006/0028400 A1 | | 2/2006 | Lapstun et al. |
| 2006/0072206 A1 | * | 4/2006 | Tsuyuki et al. ............. 359/631 |
| 2006/0077558 A1 | | 4/2006 | Urakawa et al. |
| 2006/0119539 A1 | * | 6/2006 | Kato et al. ..................... 345/8 |
| 2006/0221266 A1 | | 10/2006 | Kato et al. |
| 2006/0250322 A1 | * | 11/2006 | Hall et al. ..................... 345/8 |
| 2007/0052672 A1 | * | 3/2007 | Ritter et al. ................. 345/156 |
| 2007/0097495 A1 | * | 5/2007 | Knoblich et al. ............ 359/384 |
| 2007/0132950 A1 | | 6/2007 | Victor et al. |
| 2007/0273983 A1 | * | 11/2007 | Hebert ........................ 359/708 |
| 2008/0024597 A1 | | 1/2008 | Yang et al. |
| 2008/0048931 A1 | | 2/2008 | Ben-Ari |
| 2008/0117289 A1 | | 5/2008 | Schwoengerdt et al. |
| 2008/0216171 A1 | * | 9/2008 | Sano et al. ..................... 726/19 |
| 2008/0285140 A1 | | 11/2008 | Amitai |
| 2009/0174864 A1 | | 7/2009 | Hutchin |
| 2009/0243967 A1 | | 10/2009 | Kato |
| 2009/0284608 A1 | | 11/2009 | Hong et al. |
| 2010/0079356 A1 | * | 4/2010 | Hoellwarth ..................... 345/8 |
| 2010/0085462 A1 | | 4/2010 | Sako et al. |
| 2010/0110368 A1 | | 5/2010 | Chaum |
| 2010/0149073 A1 | * | 6/2010 | Chaum et al. ................... 345/8 |
| 2010/0186072 A1 | | 7/2010 | Kumar |
| 2010/0289880 A1 | | 11/2010 | Moliton et al. |
| 2011/0109880 A1 | | 5/2011 | Nummela |
| 2011/0194029 A1 | * | 8/2011 | Herrmann et al. ............ 348/569 |
| 2011/0214082 A1 | | 9/2011 | Osterhout et al. |
| 2012/0021806 A1 | | 1/2012 | Maltz |
| 2013/0038510 A1 | | 2/2013 | Brin et al. |
| 2013/0044042 A1 | | 2/2013 | Olsson et al. |
| 2013/0050642 A1 | | 2/2013 | Lewis et al. |
| 2013/0050833 A1 | | 2/2013 | Lewis et al. |

FOREIGN PATENT DOCUMENTS

| | | |
|---|---|---|
| EP | 2275856 | 1/2011 |
| KR | 200900708085 | 7/2009 |

OTHER PUBLICATIONS

Response to Office Action dated Feb. 3, 2014, U.S. Appl. No. 13/221,707, filed Aug. 30, 2011.

Response to Office Action dated Mar. 3, 2014, U.S. Appl. No. 13/221,662, filed Aug. 30, 2011.

Response to Office Action dated Mar. 24, 2014, U.S. Appl. No. 13/941,439, filed Jul. 12, 2013.

Notice of Allowance dated Apr. 2, 2014, U.S. Appl. No. 13/941,439, filed Jul. 12, 2013.

Amendment dated Nov. 14, 2013, U.S. Appl. No. 13/941,439, filed Jul. 12, 2013.

Bagnell, C. Robert, Jr. "Pathology 464—Light Microscopy, Chapter 1—Parts", Class Notes, University of North Carolina School of Medicine, Jan. 2001 [retrieved on Feb. 2, 2011] Chapel Hill, North Carolina, USA. Retrieved from the Internet, URL: <http://www.med.unc.edu/microscopy/files/courses/light-microscopy/Chapter%201%20-%20Parts>, 8 pages.

Ramu, G. et al., "A Flexure-based Deployable Stereo Vision Mechanism and Temperature and Force Sensors for Laparoscopic Tools", Proceedings of the 14th National Conference on Machines and Mechanisms (NaCoMM09), Dec. 17-18, 2009, NIT, Durgapur, India, 6 pages.

ZionEyez, A Social Media Company [online], Copyright ZionEyez 2011 [retrieved on Jun. 15, 2011], Retrieved from the Internet: <URL:http://www.zioneyez.com/#/home/>, 6 pages.

Brudder, et al., "Estimation of Virtual Interpupillary Distances for Immersive Head-Mounted Displays", Proceedings of the 7th Symposium on Applied Perception in Graphics and Visualization (APGV '10), Association for Computing Machinery, Jul. 24-25, 2010, Los Angeles, California, USA, 1 page.

Livingston et al., "Vertical Vergence Calibration for Augmented Reality Displays", Proceedings of the IEEE Conference on Virtual Reality, pp. 293-294, Mar. 25-29, 2006, Alexandria, Virginia, USA, 2 pages.

Owen, et al, "Display-Relative Calibration for Optical See-Through Head-Mounted Displays", Proceedings of the Third IEEE and ACM International Symposium on Mixed and Augmented Reality (ISMAR 2004), Nov. 2-5, 2004, Arlington, Virginia, USA, 9 pages.

Pansing, et al., "Optimization of illumination schemes in a head-mounted display integrated with eye tracking capabilities", Proceedings of the SPIE International Society for Optical Engineering, vol. 5875, Aug. 2005, San Diego, California, USA, 13 pages.

Piantanida, Tom, "Another Look at HMD Safety", CyberEdge Journal, November/December issue, 1993 [retrieved on Feb. 1, 2011] Retrieved from the Internet: URL<http://www.cyberedge.com/info_r_a%2Bp05_hmd-again.html>, 2 pages.

"Interpupillary Distance", Wikipedia, the free encyclopedia [online], [retrieved on May 17, 2011], Retrieved from the Internet: URL<http://en.wikipedia.org/wiki/Interpupillary_distance>, 3 pages.

"Pupillary Distance", Wikipedia, the free encyclopedia [online], [retrieved on May 13, 2011], Retrieved from the Internet: URL<http://en.wikipedia.org/wiki/Pupillary_distance>, 2 pages.

Hong, et al., "Modeling of an eye-imaging system for optimizing illumination schemes in an eye-tracked head-mounted display," Applied Optics, Nov. 2007, vol. 46, No. 31, Optical Society of America: Washington, DC, USA, 14 pages.

(56) References Cited

OTHER PUBLICATIONS

Thalheim, et al., "Body Check: Biometric Access Protection Devices and their Programs Put to the Test," c't magazin für computer technik, Nov. 2002, Hannover, Germany, 19 pages.

Davis, Amanda, "Sunglasses Block the Brightest of Light," LCD lenses and sensor eliminate glare, The Institute [online], IEEE, Nov. 4, 2011 [retrieved on Nov. 8, 2011], Retrieved from the Internet: <URL:http://theinstitute.ieee.org/technology-focus/technology-topic/sunglasses-block-the-brightest-of-light>, 5 pages.

Chen et al., "Research on Eye-gaze Tracking Network Generated by Augmented Reality Application", Proceedings of the Second International Workshop on Knowledge Discovery and Data Mining, Jan. 23-25, 2009, pp. 594-597 IEEE, Moscow, Russia, 4 pages.

"Helmet Mounted Display (HMD) with Built-In Eye Tracker", Datasheet, National Aerospace Laboratory (NLR), Jan. 2009, Retrieved from the Internet: URL: <http://www.nlr.nl/ATTS/flyer%20HMD%20F294-03.pdf>, 4 pages.

Hillaire, et al., "Using an Eye-Tracking System to Improve Camera Motions and Depth-of-Field Blur Effects in Virtual Environments", Proceedings of the 2008 Virtual Reality Conference, Mar. 8-12, 2008, pp. 47-50, IEEE: Reno, NE, USA. Retrieved from the Internet Nov. 11, 2010, URL: <http://www.irisa.fr/bunraku/GENS/alecuyer/vr08_hillaire.pdf>, 4 pages.

Kim et al., "Vision-Based Eye-Gaze Tracking for Human Computer Interface", Proceedings of the 1999 Conference on Systems, Man, and Cybernetics, Oct. 12-15, 1999, pp. 324-329, vol. 2. IEEE: Toyko, Japan, 3 pages.

Lee et al., "Robust Gaze Tracking Method for Stereoscopic Virtual Reality Systems", J. Jacko (Ed.). Proceedings of the 12th international conference on Human-computer interaction: intelligent multimodal interaction environments (HCI'07), Jul. 22-27, 2007, pp. 700-709. Retrieved from the Internet: URL: <http://delivery.acm.org/10.1145/1770000/1769669/p700-lee.pdf?key1=1769669&key2=3272740821&coll=GUIDE&dl=GUIDE&CFID=98778950&CFTOKEN=13851951>, 10 pages.

Liu, et al.,"Real Time Auto-Focus Algorithm for Eye Gaze Tracking System", Proceedings of the 2007 International Symposium on Intelligent Signal Processing and Communication Systems, Nov. 28-Dec. 1, 2007, pp. 742-745, Xiamen, China, 4 pages.

Rolland, et al., "Displays—Head-Mounted", In Encyclopedia of Optical Engineering, New York: Marcel Dekker, 2005 [retrieved on Nov. 11, 2010] Retrieved from the Internet: URL: <http://www.optics.arizona.edu/opti588/reading/HMD_Rolland_Hua_2005.pdf>, 16 pages.

Nilsson, et al., "Hands Free Interaction with Virtual Information in a Real Environment: Eye Gaze as an Interaction Tool in an Augmented Reality System", PsychNology Journal, vol. 7, No. 2, pp. 175-196, Apr. 28, 2009, 22 pages.

Handa, et al., "Development of head-mounted display with eye-gaze detection function for the severely disabled", 2008 IEEE International Conference on Virtual Environments, Human-Computer Interfaces, and Measurement Systems (VECIMS 2008), Jul. 14-16, 2008, Istanbul, Turkey, 5 pages.

"Head Fixed Eye Tracking System Specifications", Arrington Research [online], Retrieved from the Internet on Jun. 10, 2011: <URL: http://www.arringtonresearch.com/techinfo.html>, 2 pages.

Gang, Wen, "Chapter 3 Gaze Estimation System", National University of Singapore, ScholarBank@NUS [online], 2004 [retrieved on Jun. 10, 2011], Retrieved from the Internet: URL:<http://scholarbank.nus.edu.sg/bitstream/handle/10635/13692/Chapter3_GazeDetectionSystem.pdf?sequence=5>,10 pages.

Reale, et al., "Viewing Direction Estimation Based on 3D Eyeball Construction for HRI", IEEE Computer Society Conference on Computer Vision and Pattern Recognition Workshops, Jun. 13-18, 2010, pp. 24-31, San Francisco, CA, IEEE Publishers, 8 pages.

Ebisawa, Yoshinobu, "Unconstrained Pupil Detection Technique Using Two Light Sources and the Image Difference Method", Visualization and Intelligent Design in Engineering and Architecture II, Published 1995, 11 pages.

Hennessey, et al., "A Single Camera Eye-Gaze Tracking System with Free Head Motion", Proceedings of the 2006 Symposium on Eye Tracking Research and Applications, Mar. 27-29, 2006, pp. 87-94, ACM, New York, NY, 8 pages.

Villanueva, et al., "Geometry Issues of Gaze Estimation", Advances in Human Computer Interaction, Oct. 2008, InTech, pp. 513-534, 22 pages.

Pomplun, et al., "Using Pupil Size as a Measure of Cognition Workload in Video-Based Eye-Tracking Studies", Department of Computer Science, Research Article [online], [retrieved on Jun. 10, 2011] Retrieved from the Internet: <URL: http://www.cs.umb.edu/~marc/pubs/pomplun_sunkara_fairley_xiao_draft.pdf>, 37 pages.

Ajanki, et al., "Ubiquitous Contextual Information Access with Proactive Retrieval and Augmentation", Proceedings of the Fourth International Workshop in Ubiquitous Augmented Reality (IWUVR 2010), May 17, 2010, Helsinki, Finland, 5 pages.

Herbelin, et al., "Coding gaze tracking data with chromatic gradients for VR Exposure Therapy", Proceedings of the 17th International Conference on Artificial Reality and Telexistence (ICAT '07), Nov. 28-30, 2007, Esbjerg, Denmark, 8 pages.

Kollenberg, et al., "Visual Search in the (Un)Real World: How Head-Mounted Displays Affect Eye Movements, Head Movements and Target Detection", Proceedings of the 2010 Symposium on Eye-Tracking Research & Applications (ETRA '10), Mar. 22-24, 2010, Austin Texas, 4 pages.

Ajanki, et al. "Contextual Information Access with Augmented Reality." In Proceedings of IEEE International Workshop on Machine Learning for Signal Processing (MLSP), Aug. 29-Sep. 1, 2010, pp. 95-100: Kittilä, Finland, 6 pages.

Li, et al., "An Efficient Method for Eye Tracking and Eye-Gazed FOV Estimation," Proceedings of the 16th IEEE international conference on Image processing (ICIP'09), pp. 2597-2600, Nov. 2009, Cairo, Egypt, 4 pages.

Lin et al., "A new data processing and calibration method for an eye-tracking device pronunciation system," Optics & Laser Technology, Apr. 2002, vol. 34, pp. 405-413. Elsevier Science Ltd. New York, NY, USA, 9 pages.

"Technology: PicoP Display Engine—How it Works," MicroVision: PicoP Technology [online], Retrieved from the Internet [retrieved on Sep. 21, 2011], <URL: http://www.microvision.com/technology/picop.html>, 46 pages.

Ji, et al., "Eye and Gaze Tracking for Interactive Graphic Display", In Journal of Machine Vision and Applications, vol. 15, Issue 3, Jun. 8, 2004, 10 pages.

Akeley et al., "A Stereo Display Prototype with Multiple Focal Distances", Proceedings of ACM SIGGRAPH, Aug. 2004, pp. 804-813. ACM, Inc., New York, NY, USA, 10 pages.

Blum, et al., "The Effect of Out-of-focus Blur on Visual Discomfort When Using Stereo Displays", Proceedings of the 2010 International Symposium on Mixed and Augmented Reality, Oct. 13-16, 2010, pp. 13-17, IEEE: Seoul, Korea, 5 pages.

Barras, Colin, "Innovation: Gaze trackers eye computer gamers", NewScientist [online]. Mar. 26, 2010 [retrieved on Aug. 26, 2010] Retrieved from the Internet: URL: <http://www.newscientist.com/article/dn18707-innovation-gaze-trackers-e>, 4 pages.

"Gaze-enhanced User Interface Design", Stanford HCI Group [online]. Retrieved from the Internet on Aug. 27, 2010: URL: <http://hci.stanford.edu/research/GUIDe/>, 3 pages.

Cadden, Ricky, "Nokia Has Been Fine-Tuning Eye-Tracking Glasses", Symbian-Guru.com [online], Sep. 6, 2009 [retrieved on Aug. 26, 2010] Retrieved from the Internet: URL: <http://www.symbian-guru.com/welcome/2009/09/nokia-has-been-fine-tuning-eye-tracking-glasses.html>, 3 pages.

Hua, et al., "Modeling of an eye-imaging system for optimizing illumination schemes in an eye-tracked head-mounted display," Applied Optics, Nov. 2007, vol. 46, No. 31, Optical Society of America: Washington, DC, USA, 14 pages.

Supplemental Notice of Allowance Due dated Feb. 28, 2013, U.S. Appl. No. 13/221,739, filed Aug. 30, 2011.

Notice of Allowance and Fee(s) Due dated Dec. 12, 2012, U.S. Appl. No. 13/221,739, filed Aug. 30, 2011.

(56) References Cited

OTHER PUBLICATIONS

Amendment filed Oct. 16, 2012, U.S. Appl. No. 13/221,739, filed Aug. 30, 2011.
Office Action dated Sep. 6, 2012, U.S. Appl. No. 13/221,739, filed Aug. 30, 2011.
U.S. Appl. No. 13/844,453, filed Mar. 15, 2013.
Office Action dated May 1, 2013, U.S. Appl. No. 13/221,707, filed Aug. 30, 2011.
Amendment filed Jan. 14, 2013, U.S. Appl. No. 13/221,707, filed Aug. 30, 2011.
Office Action dated Sep. 14, 2012, U.S. Appl. No. 13/221,707, filed Aug. 30, 2011.
Office Action dated Apr. 25, 2013, U.S. Appl. No. 13/221,662, filed Aug. 30, 2011.
Amendment filed Jan. 14, 2013, U.S. Appl. No. 13/221,662, filed Aug. 30, 2011.
Office Action dated Sep. 13, 2012, U.S. Appl. No. 13/221,662, filed Aug. 30, 2011.
Notice of Alllowance Apr. 11, 2012, Canadian Patent Application No. 2,750,287 filed Aug. 29, 2011.
Amendment dated Feb. 28, 2012, Canadian Patent Application No. 2,750,287 filed Aug. 29, 2011.
Office Action dated Feb. 22, 2012, Canadian Patent Application No. 2,750,287 filed Aug. 29, 2011.
Amendment dated Jan. 31, 2012, Canadian Patent Application No. 2,750,287.
Office Action dated Nov. 7, 2011, Canadian Patent Application No. 2,750,287 filed Aug. 29, 2011.
International Search Report dated Feb. 26, 2013, International Patent Application No. PCT/US2012/052806 filed Aug. 29, 2012.
Office Action dated Oct. 1, 2013, U.S. Appl. No. 13/221,707, filed Aug. 30, 2011.
Office Action dated Oct. 3, 2013, U.S. Appl. No. 13/221,662, filed Aug. 30, 2011.
Lee, Jeong Jun et al., "Iris Recognition in Wearable Computer," Lecture Notes in Computer Science, vol. 3072/2004, pp. 475-483, Jul. 2004.
International Search Report & The Written Opinion dated Feb. 27, 2013, International Application No. PCT/US2012/052839.
Response to Office Action dated Aug. 26, 2013, U.S. Appl. No. 13/221,662, filed Aug. 30, 2011.
Response to Office Action dated Sep. 3, 2013, U.S. Appl. No. 13/221,707, filed Aug. 30, 2011.
Office Action dated Sep. 6, 2013, U.S. Appl. No. 13/941,439, filed Jul. 12, 2013.
Office Action dated Jun. 5, 2014, U.S. Appl. No. 13/221,707, filed Aug. 30, 2011.
Office Action dated Jun. 6, 2014, U.S. Appl. No. 13/221,662, filed Aug. 30, 2011.
Office Action dated Jun. 23, 2014, Chinese Patent Application No. 201210313552.9 filed Aug. 29, 2012.
Office Action dated Jun. 4, 2014, Chinese Patent Application No. 201210312701.X filed Aug. 29, 2012.
Lee et al, "Iris Recognition in Wearable Computer", Biometric Authentication, First International Conference, ICBA 2004, Hong Kong, China, Jul. 15-17, 2004, pp. 475-483.
Notice of Allowance and Fee(s) Due dated Sep. 5, 2014 in U.S. Appl. No. 13/941,439.
Response to Office Action filed Sep. 6, 2014 in U.S. Appl. No. 13/221,707.
Response to Office Action filed Oct. 27, 2014, and partial English translation thereof, in Chinese Patent Application No. 201210313552.9.
Response to Office Action filed Oct. 16, 2014, and partial English translation thereof, in Chinese Patent Application No. 201210312701.X.
Response to Office Action filed Nov. 6, 2014 in U.S. Appl. No. 13/221,662.
Notice of Allowance and Fee(s) Due dated Nov. 19, 2014 in U.S. Appl. No. 13/844,453.
Supplementary European Search Report dated Jan. 8, 2015, in European Patent Application No. 12827964.3 filed Aug. 30, 2012.
Notice of Allowance and Fee(s) Due dated Jan. 7, 2015 in U.S. Appl. No. 13/221,707.
Final Office Action dated Feb. 10, 2015 in U.S. Appl. No. 13/221,662.
Notice of Allowance and Fee(s) Due dated Apr. 15, 2015 in U.S. Appl. No. 13/844,453.
Response to Final Office Action filed Apr. 24, 2015 in U.S. Appl. No. 13/221,662.
Communication pursuant to Article 94(3) EPC dated May 15, 2015 in European Patent Application No. 12827964.3.
Office Action, and partial English translation, dated May 25, 2015 in Chinese Patent Application No. 201210312701.X.

* cited by examiner

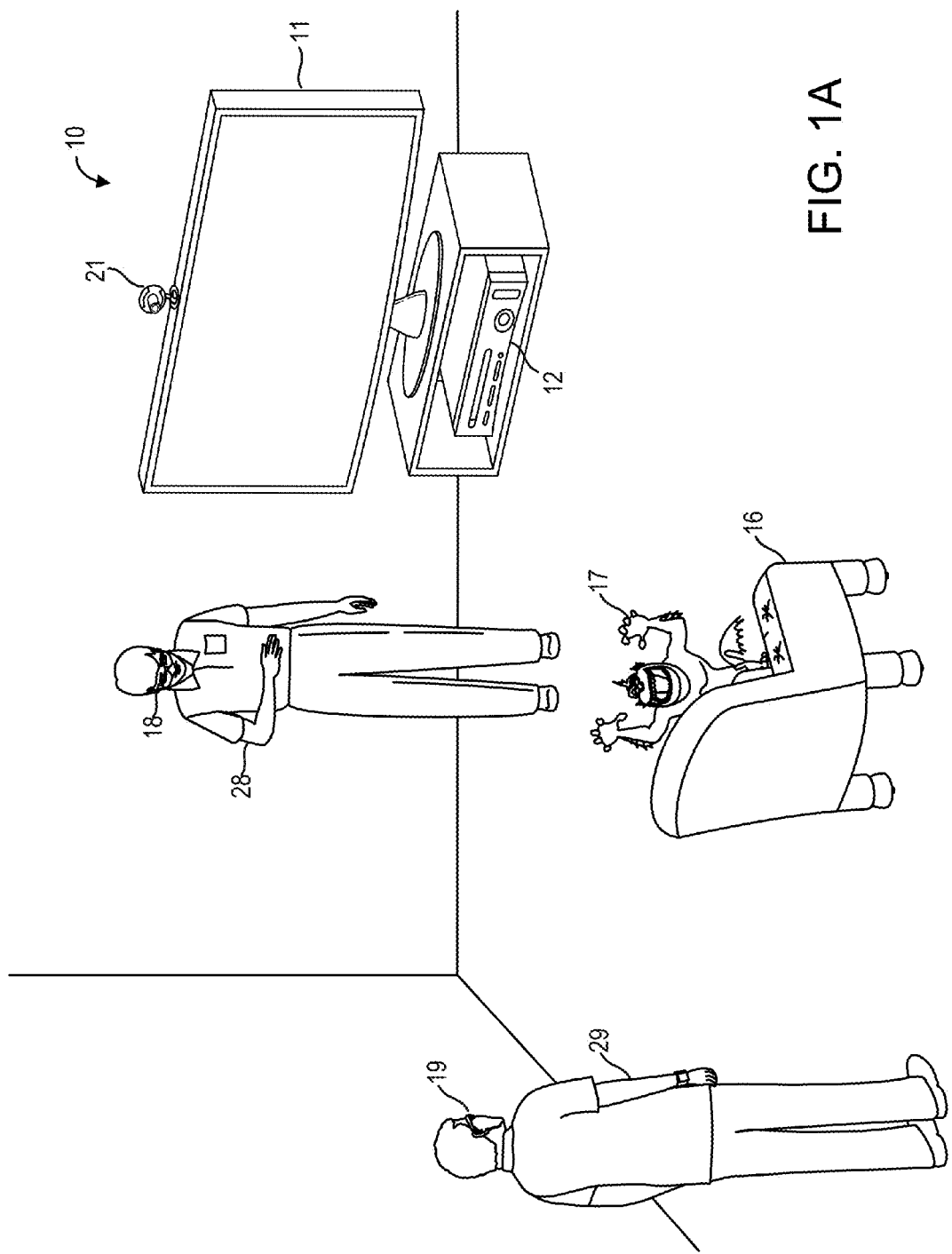

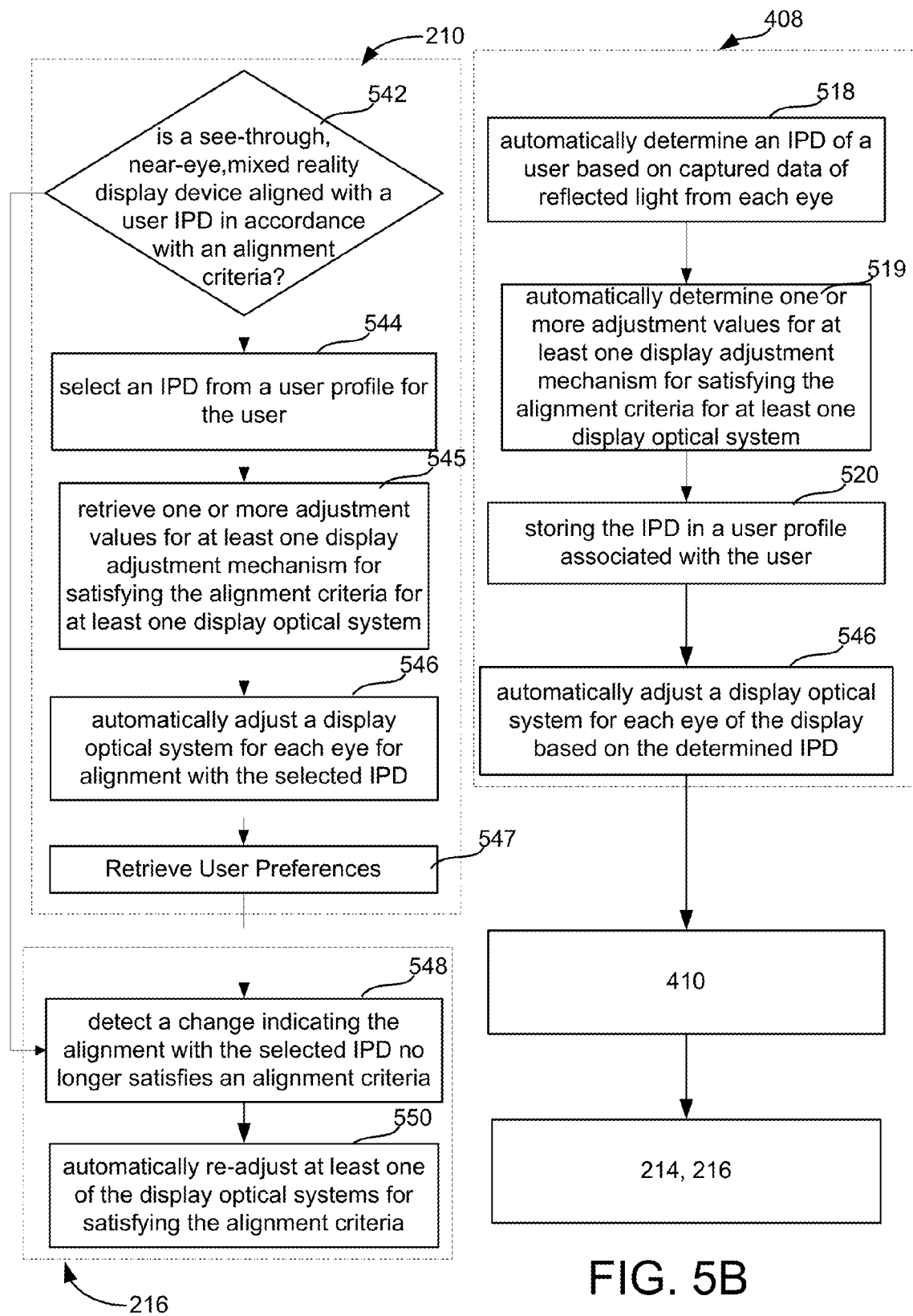

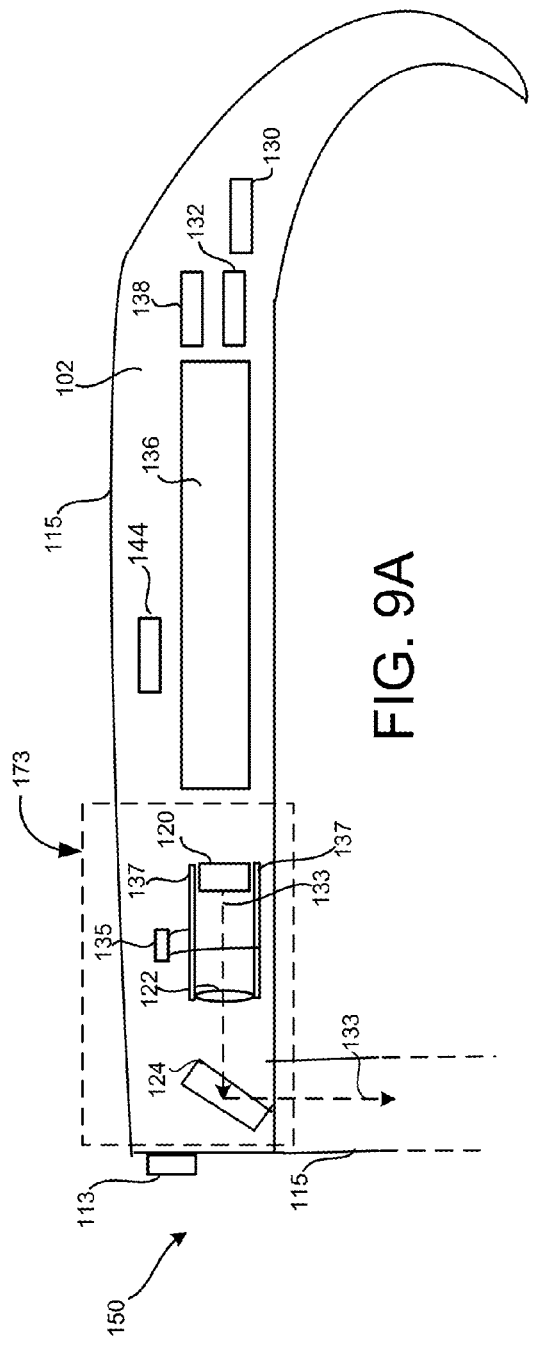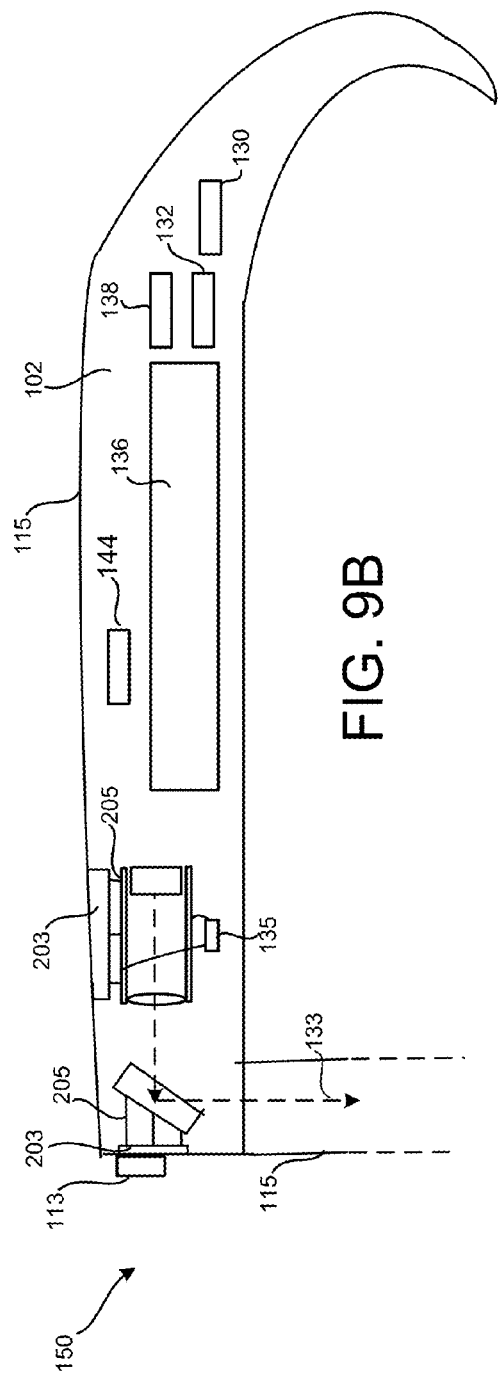

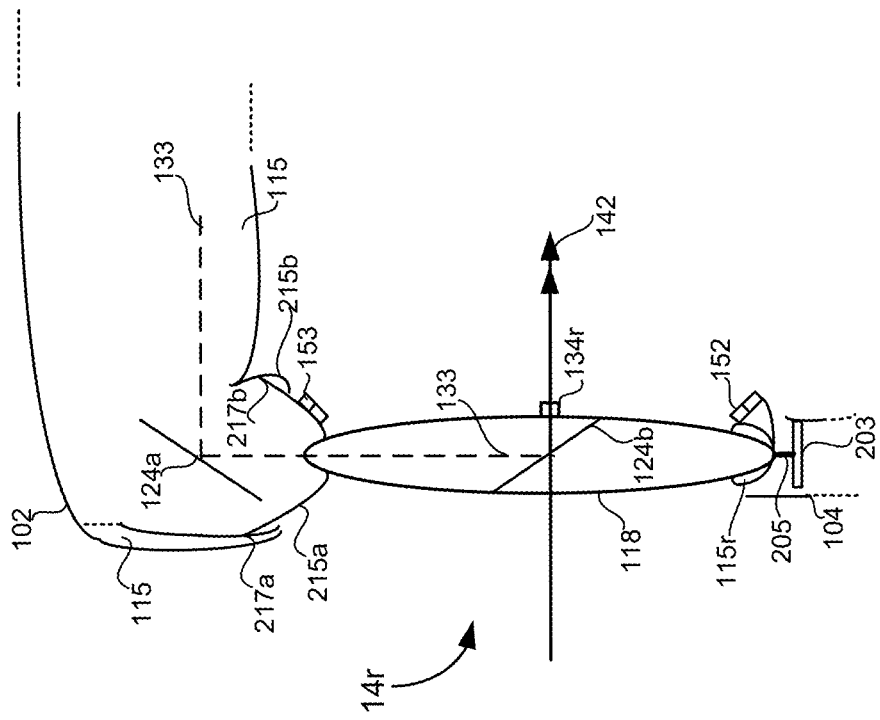
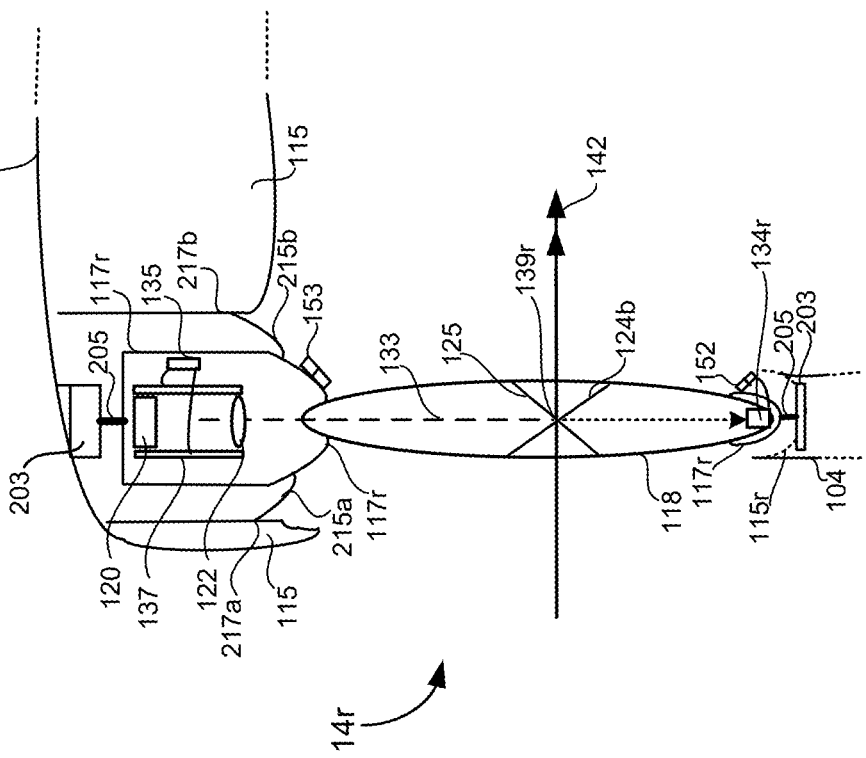

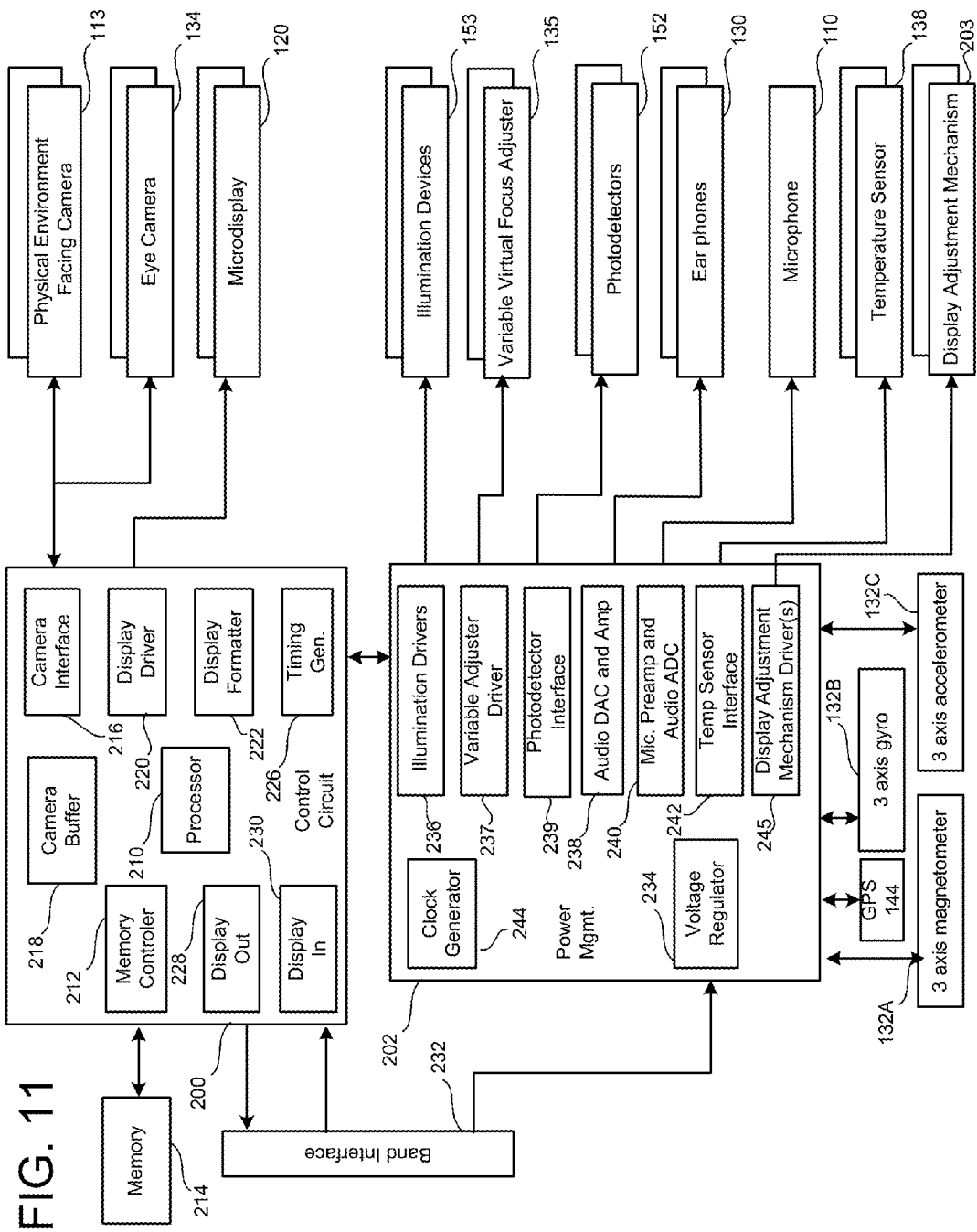

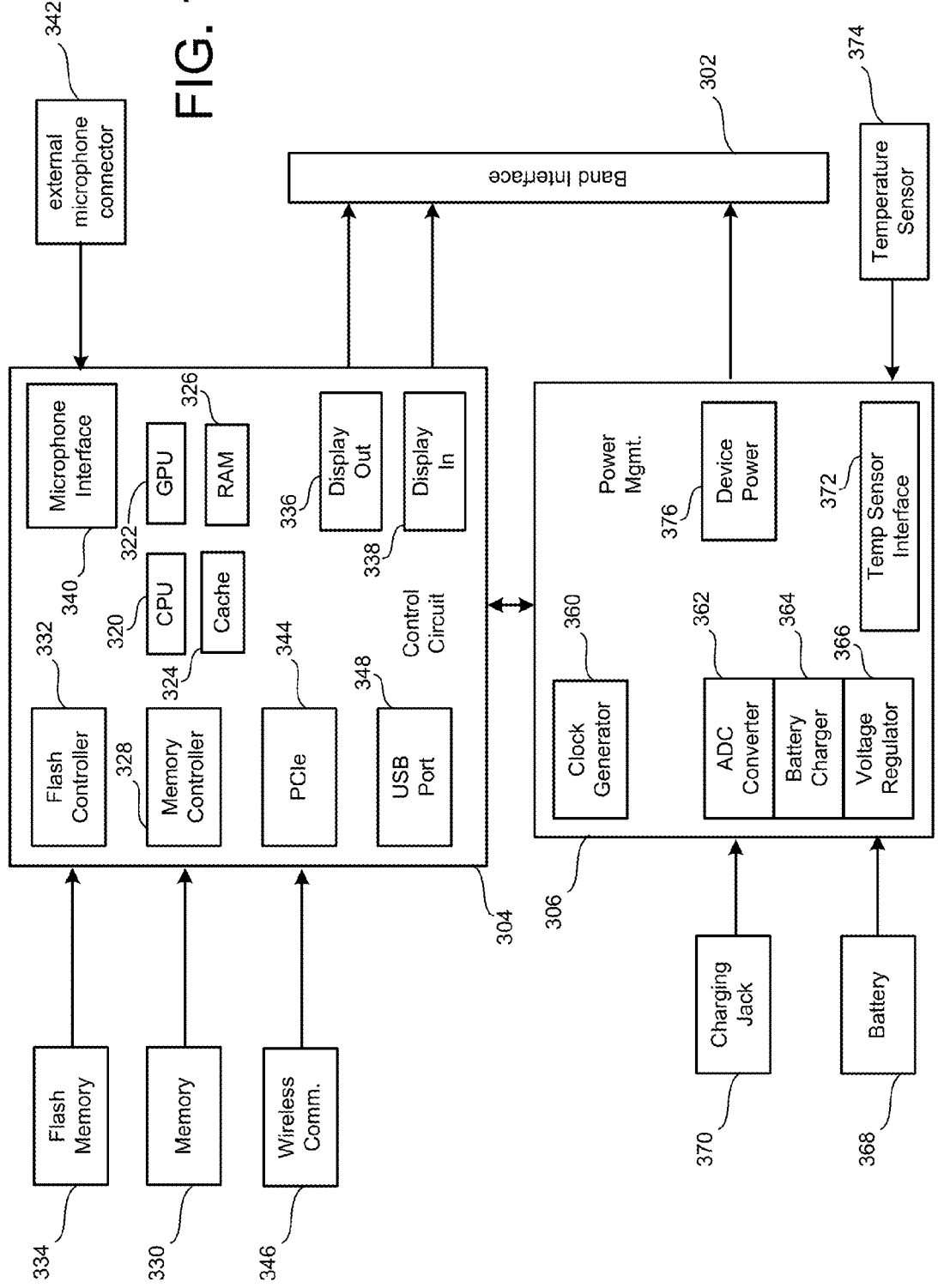

IMPROVING DISPLAY PERFORMANCE WITH IRIS SCAN PROFILING

CLAIM OF PRIORITY

This application is a continuation application of co-pending U.S. patent application Ser. No. 13/221,669, entitled "HEAD MOUNTED DISPLAY WITH IRIS SCAN PROFILING," by Perez et al., filed Aug. 30, 2011, incorporated herein by reference in its entirety.

BACKGROUND

Head mounted displays and binoculars are examples of binocular viewing systems in which there is an optical system for each of a user's two eyes to view a scene. Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. An AR environment may be used to enhance numerous applications including video game, mapping, navigation, and mobile device applications.

Some AR environments enable the perception of real-time interaction between real objects (i.e., objects existing in a particular real-world environment) and virtual objects (i.e., objects that do not exist in the particular real-world environment). Properly aligning a head mounted display improves the ability of an AR system using the display to realistically integrate the virtual objects into an AR environment of the display.

SUMMARY

Technology is provided which enables a see-through head mounted-display with eye imaging technology to optimize performance of the display by referencing a user profile automatically. The identity of the user is determined by performing an iris scan and recognition of a user enabling user profile information to be retrieved and used to enhance the user's experience with the see through head mounted display. The user profile may contain user preferences regarding services providing augmented reality images to the see-through head-mounted display, as well as display adjustment information optimizing the position of display elements in the see-though head-mounted display.

In one aspect, a method controlling a see-through head-mounted display device includes providing imagery for imaging at least one eye of a user with a see-through, near-eye, mixed reality display. The display includes, for each eye, a optical system, including at least one sensor generating image data of the eye and a display. The method determines a pattern in the image of an iris of the at least one eye and associates user profile information with the user based on the pattern to identify the user. The device is then operated to provide augmented reality images to the user in the display optical system based on the user preferences in the user profile.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A one embodiment of a field of view as seen by a user wearing a see through HMD.

FIG. 5A is a flowchart illustrating a method for setting a user configuration based on an iris scan and operating a device with user profile settings.

FIG. 5B is a flowchart illustrating a method determining user device preference settings for a user's inter-pupillary distance.

FIG. 9A is a side view of an eyeglass temple in an embodiment of a mixed reality display device providing support for hardware and software components.

FIG. 9B is a side view of an eyeglass temple in an embodiment of a mixed reality display device providing support for hardware and software components and three dimensional adjustment of a microdisplay assembly.

FIG. 10A is a top view of an embodiment of a movable display optical system of a see-through, near-eye, mixed reality device including an arrangement of gaze detection elements.

FIG. 10B is a top view of another embodiment of a movable display optical system of a see-through, near-eye, mixed reality device including an arrangement of gaze detection elements.

FIG. 11 is a block diagram of one embodiment of hardware and software components of a see-through, near-eye display unit as may be used with one or more embodiments.

FIG. 12 is a block diagram of one embodiment of the hardware and software components of a processing unit associated with a see-through, near-eye, mixed reality display unit.

DETAILED DESCRIPTION

Technology is presented to utilize a see through head mounted display having camera technology utilized thereon to perform an iris scan and recognition of a user enabling user profile information to be retrieved and enhance the user's experience with the see through head mounted display. The user profile may contain user preferences regarding services providing augmented reality images to the see-through head-mounted display, as well as display adjustment information optimizing the position of display elements in the see-though head-mounted display.

Figure 1B:
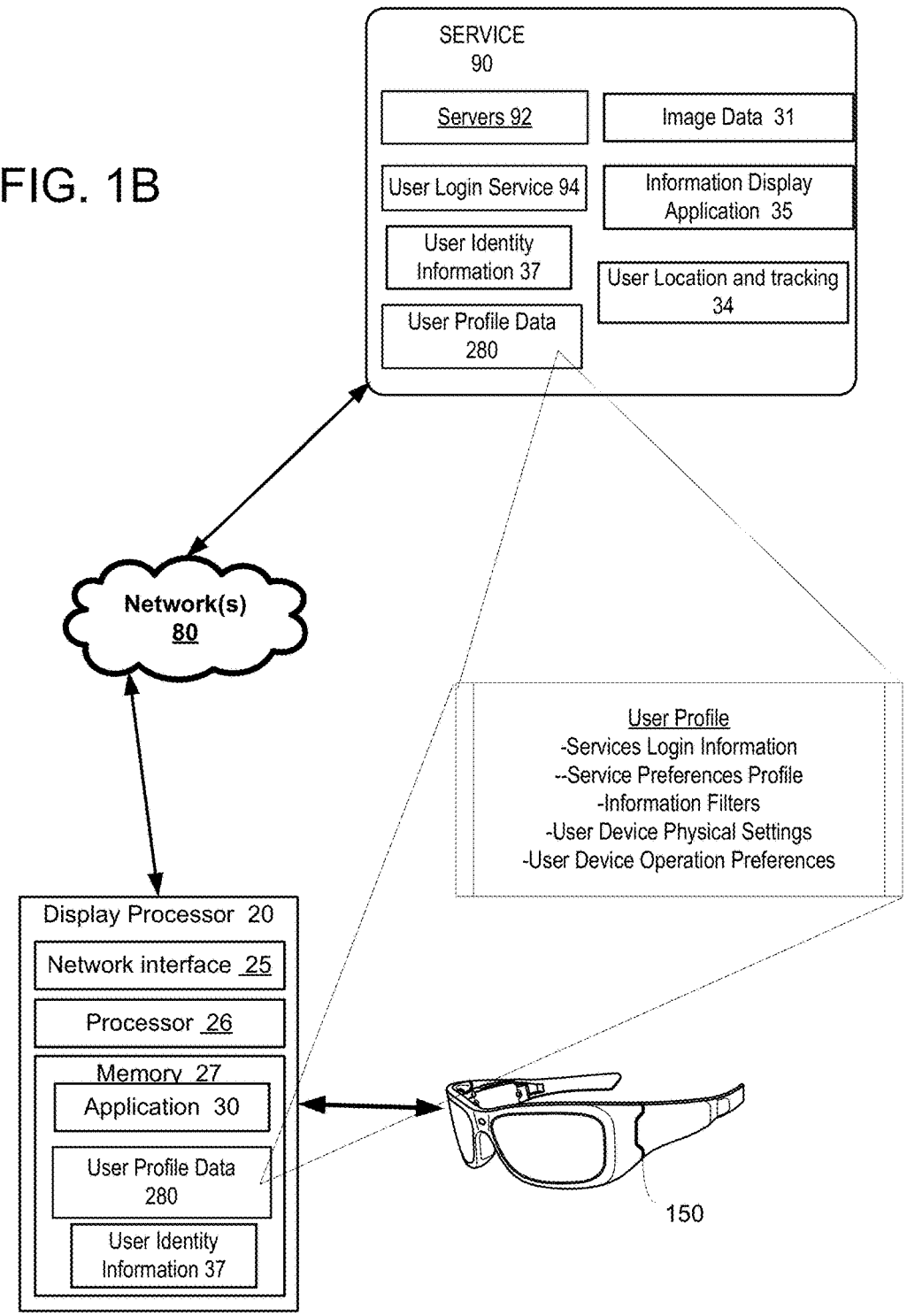
FIG. 1B is a block diagram depicting example components of another embodiment of a see-through, mixed reality display device
Figure 7A:
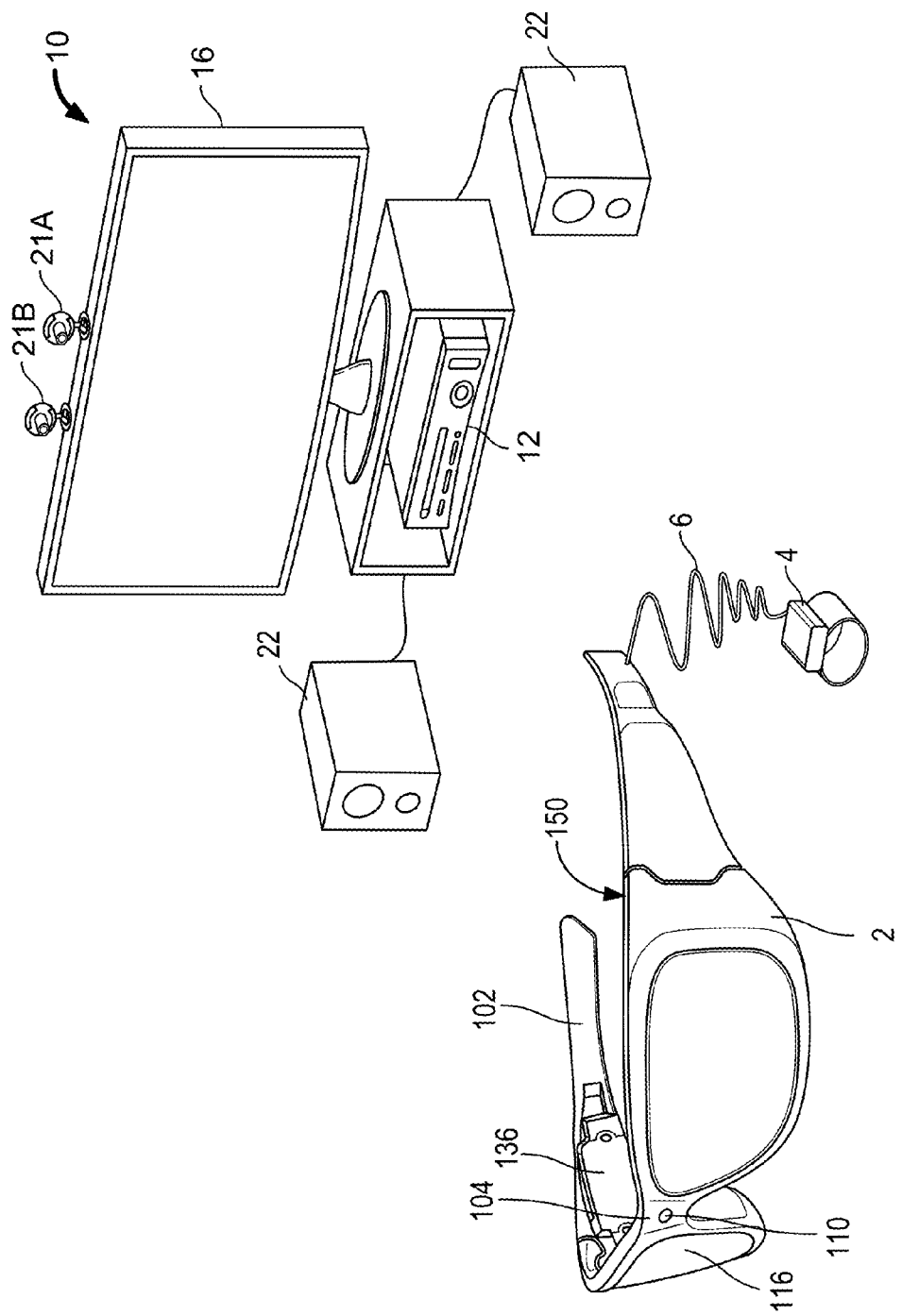
FIGS. 7A and 7B are block diagrams depicting example components of an embodiment of a see-through, mixed reality display device with adjustable IPD.
Figure 7B:
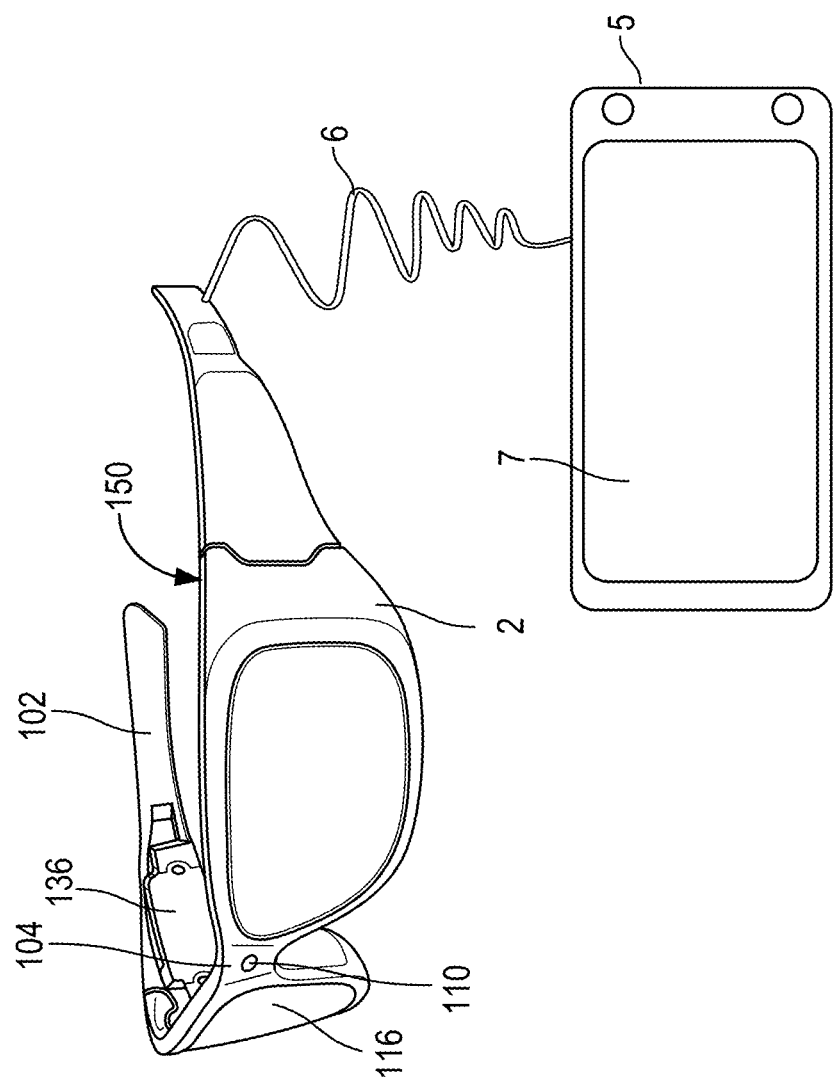

FIG. 1A depicts one embodiment of a field of view as seen by a user wearing a see through head mounted device 150 illustrated and described with respect to FIGS. 1B, 7A and 7B. The user may see within the field of view both real objects and virtual objects. The real objects may include a chair 16 and a hub computing system 10 and display. The virtual objects may include a virtual monster 17. As the virtual monster 17 is displayed or overlaid over the real-world environment as perceived through the see-through lenses of the HMD, the user may perceive that the virtual monster 17 exists within the real-world environment.

The environment includes two head mounted display devices 150(1) and 150(2). The hub computing system 10 may include a computing environment 12, one or more capture devices 21, and a display 11, all in communication with each other. Computing environment 12 may include one or more processors. Capture device 21 may include a color or depth sensing camera that may be used to visually monitor one or more targets including humans and one or more other objects within a particular environment. In one example, capture device 21 may comprise an RGB or depth camera and computing environment 12 may comprise a set-top box or gaming console. Hub computing system 10 may support multiple head mounted displays.

As shown in FIG. 1A user 28 wears see-through head-mounted display 18 150(1) and user 29 wears see-through head-mounted display 19 150(2). The wears see-through head-mounted display 150(1) and 150(2) may receive virtual data from any of a number of processing devices as described herein, including hub computing system 10, such that a virtual object is perceived to exist within a field of view as displayed through the respective mobile device. For example, as seen by user 28 through see-through head-mounted display (1), the virtual object is displayed as the back (not shown) of virtual monster 17. As seen by user 29 through see-through head-mounted display 150(1), the virtual object is displayed as the front of virtual monster 17 appearing above the back of chair 16.

FIG. 1B illustrates a block diagram of a see-though head-mounted display 150 and system for implementing the present technology. A head mounted display device 150 will be coupled to a processing unit 20 which may comprise any of the processing devices disclosed herein including but not limited to processing unit 4, the mobile device 5, or the hub computing system 12, discussed below. The display processor may include a network interface 25, a processor 26, and memory 27, with the memory 27 including one or more applications 30 and storing user profile information 280. Applications 30 may be present within the memory 27 of the display processor and provide a user with the information overlaid in the display of the see though head mounted device. The display processor will be coupled to the head mounted display device 150 through any of the number of various means, as described below. The processing unit 20 interacts with a network 80, such as the Internet, using network interface 25 to couple the head mounted display device 150, for example, an augmented reality service 90 which provides data for the display application 30.

The augmented reality service 90 may provide one or more servers 92 which provide image data 31, alternative information display applications 35, user positioning services 34 for use by the display application 30. The supplemental information provider may itself create and provide supplemental event data, or may provide services which transmit event data from third party event data providers to a user's see-though head mounted display. Multiple supplemental information providers and third party event data providers may be utilized with the present technology.

Processor 26 may execute programmatic instructions to implement the application 30 and other services described herein. Processing unit 20 may comprise any of the examples of processing devices described herein.

Shown in FIG. 1B is an exemplary user profile 280. As illustrated in FIG. 1B, the user profile 280 may be stored on a processing unit 20 associated with the display device 150, or stored by the augmented reality service 90. Profile 280 may include login information for any of the services provided by the augmented reality service 90, service preference information, information filter information, user device physical settings, and user device operational settings.

Augmented reality service 90 may provide any of a number of services utilizing the see through head mounted display device 150. Examples of such services include an event-based, real-time information service (as for example described in U.S. patent application Ser. No. 13/112,919 entitled EVENT AUGMENTATION WITH REAL-TIME INFORMATION), a life radar tracking service (as for example described in U.S. patent application Ser. No. 12/818,106 entitled CONTEXTUAL BASED INFORMATION AGGREGATION SYSTEM) and a life streaming service (as for example described in U.S. patent application Ser. No. 13/031,033 Entitled LIFE STREAMING), all of which are hereby specifically incorporated by reference. For each service, login information may be required from the user to protect the user's security and privacy, as well as identify the user to the service. Service preference information may include user specified service performance preferences specific to the service being provided. Information filter information may comprise limits on the type of information the user wishes to be displayed in a see through head mounted display. Device physical settings may include positioning information, described further below, to properly align the see through head mounted display device relative to the user's gaze to properly display virtual objects to the user. Device operational settings may include brightness, contrast, and other settings that the user prefers when wearing the device.

Each user profile may include all or a subset of the aforementioned types of information. User profiles may be stored on processing unit 20 where, for example, a limited number of regular users consistently use device 150. Profiles 280 may be stored with service 90 to identify a user to any potential see-through head-mounted display 150 which may access service 90, allowing a user to interact with any device 150 which has access to the service 90 to obtain the same user experience across various different devices.

In accordance with the technology, the systems of the see through head mounted display 150 allow for the user identity to be stored with the user profile so that by wearing a see through head mounted display 150, the identity of the user may automatically be determined, the user's profile retrieved and the user experience adjusted according to the user profile. Various examples are cited below. In one aspect, the user's preference information for interacting with one or more augmented reality services are automatically accessed. In another aspect, the user's individual physical device adjustments are automatically made.

User identity information may 37 may be stored on processing unit 20 or with the augmented reality application service 90 or both. User identification is performed using the eye capture technology of the see-though head-mounted display 150 disclosed herein to perform an iris scan of the user to establish the user's identity when the user wears the see through head mounted display 150. In one aspect, the system can use the user identity to automatically adjust the see-though head-mounted display and augmented reality service to the user's stored preferences. In one aspect, the user profile can be used to automatically adjust the inter-pupillary distance of the display elements of the see through head mounted display 150. The inter-pupillary distance (IPD) typically refers to the horizontal distance between the user's pupils. The technology provides that the IPD may include a vertical or height dimension. Furthermore, a depth distance from a display optical system to a respective eye may be stored in IPD data as well. This depth distance may be monitored to detect movement of the display device with respect to the user's eye and trigger an IPD alignment check. In one embodiment, user profile data 280 is stored only on a local device such as display processor 20. Alternatively or in combination with the local device storage of the profile data, identity and profile information 280 may be stored with the alternative reality service 90. In one embodiment, no service is provided and all information is stored locally.

User profile information may include an IPD data set. The stored IPD data set may at least be used as an initial setting for a display device with which to begin an IPD alignment check. In some embodiments, the one or more processors store the position of each optical axis in the IPD data set. The IPD for a user may be asymmetrical. Adjustment values of a display adjustment mechanism for each display optical system from an initial position may be saved in the IPD data set. The initial position of the display adjustment mechanism may have a fixed position with respect to a stationary frame portion. Additionally, a position vector of the respective pupil to the user's nose may be estimated for each eye based on the fixed position to the point on the bridge and the adjustment values. The two position vectors for each eye provide at least horizontal distance components, and can include vertical distance components as well. An inter-pupillary distance IPD in one or more directions may be derived from these distance components. In addition, the IPD data set may include results of any personal calibration used for eyetracking such as estimating corneal radius, visual axis offset from optical axis, and the like, to avoid the user having to go through it more than once.

The see-though head-mounted display includes a display optical system having an optical axis positioned to be seen through by each of a user's eyes. The nearest display device is aligned with the user's IPD when the optical axis of each display optical system is aligned with the respective pupil. By having at least one sensor having a detection area positioned to receive light reflected from the eye along the optical axis, alignment of the optical axis of each display optical system with each respective pupil can be determined from data of reflected light captured during display of a virtual object at a predetermined distance and direction through the optical axis for measuring IPD. A virtual object may appear as a real item like an apple or a friend in the image. It is just that the apple or your friend is not actually in your real world field of view although the apple or the friend may appear to be in a three dimensional space in front of you and sitting on a real world item that is actually in front of you. If each pupil is not aligned within a criteria with the optical axis, the respective display optical system is adjusted until the alignment satisfies a criteria. An example of a criteria is a distance, for example 1 mm. Exemplary see-through head-mounted displays capable of detecting gaze, IPD, and automatic adjustment are disclosed in: co-pending application Ser. No. 13/221,739 now U.S. Pat. No. 8,487,838 entitled GAZE DETECTION IN A NEAR-EYE DISPLAY, inventors John R. Lewis, Yichen Wei, Robert L. Crocco, Benjamin I. Vaught, Alex Aben-Athar Kipman and Kathryn Stone Perez, assigned to the assignee of the present application and filed Aug. 30, 2011; co-pending application Ser. No. 13/221,707 filed Aug. 30, 2011 entitled ADJUSTMENT OF A MIXED REALITY DISPLAY FOR INTER-PUPILLARY DISTANCE ALIGNMENT, inventors John R. Lewis, Kathryn Stone Perez, Robert L. Crocco and Alex Aben-Athar Kipman, assigned to the assignee of the present application; and co-pending application Ser. No. 13/221,662 filed Aug. 30, 2011 entitled ALIGNING INTER-PUPIL-LARY DISTANCE IN A NEAR-EYE DISPLAY SYSTEM, inventors John R. Lewis, Yichen Wei, Robert L. Crocco, Benjamin I. Vaught, Kathryn Stone Perez, Alex Aben-Athar Kipman, assigned to the assignee of the present application.

In embodiments described below, each display optical system is positioned within a support structure which can be adjusted in position by a display adjustment mechanism. In many examples, the adjustment is automatically performed under control of a processor. For example, an adjustment in more than one direction may be performed by a collection of motors which can move the display optical system vertically, horizontally or in a depth direction. In other embodiments, the display adjustment mechanism is a mechanical display adjustment mechanism which a user actuates to position the display optical system in accordance with displayed or audio instructions. In some examples illustrated below, the control of the mechanical display adjustment mechanism is calibrated so each actuation corresponds to a measurement of distance the display optical system is to be moved in a particular direction.

Because the user identity information 37 may include information subject to one or more privacy laws and concerns, efforts may be made to store the iris information in an encrypted format. For example, each scan of user identity data may be stored as an encrypted hash which is associated with the user's profile information 280, and the image data of the iris scan discarded. This would ensure that the user's actual iris data is not stored but the profile information could be retrieved during subsequent scans.

Figure 2:
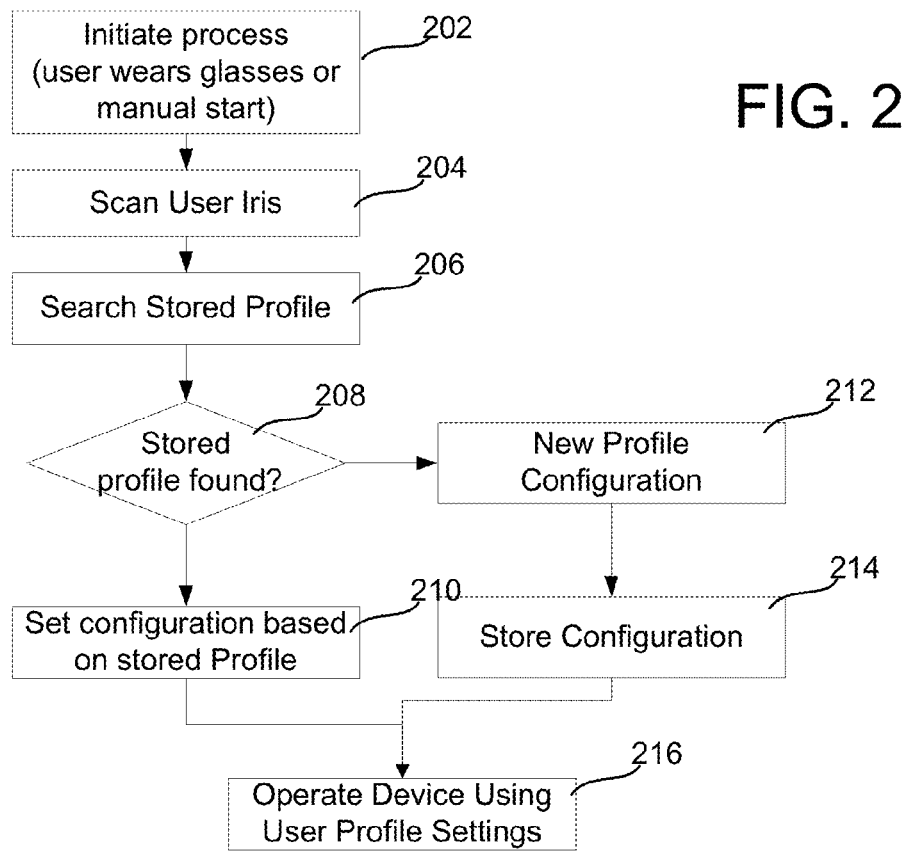
FIG. 2 is a flowchart illustrating a method in accordance with the present technology.

FIG. 2 is a flowchart illustrating the process of identifying a user in accordance with the present technology. At 202, the process is initiated by any of a number of various means. The user can wear the see-though head-mounted display and the process may automatically start, the process may begin as soon as the STHMD detects an image of an iris, or when a user selected an input method such as clicking a physical button to start the process. At 204, a user iris scan is performed. An iris scanning procedure is discussed below.

At 206, the results of the iris scan are compared against a user profile data store to determine whether a match exists between the scanned iris patter and stored iris patterns associated with user profiles. In one embodiment, the comparison at 206 may occur against locally stored profile data in the display processor memory 27. If the profile information is not found on a local processing device, identity and profile information are check in the service 90. In one embodiment, no service is provided and all information is stored locally. If a profile is found at 208, the user profile configuration settings are used to configure the see-though head-mounted display based on the user profile. If no profile is found at 208, a profile may be created at 212 and stored at 214. Storing may include storing the profile on a processing unit 20 or with the augmented reality service provider 90. Note that creation and storage of a user profile may be optional for the user. That is, a user is not required to store a user profile in order to use the augmented reality service 90.

Figure 3A:
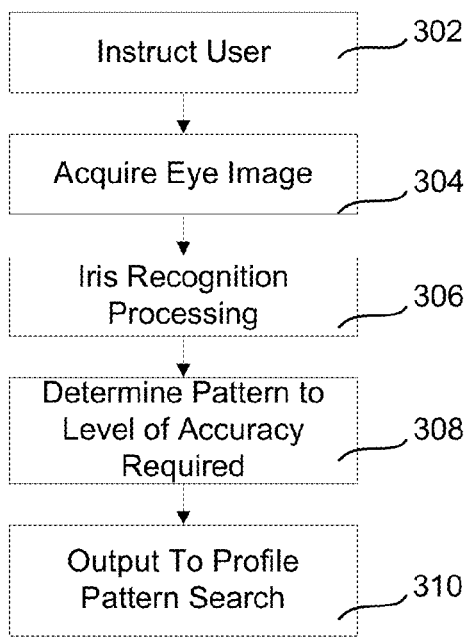
FIG. 3A is a flowchart illustrating an iris scanning procedure.

FIG. 3A is a flowchart illustrating a process 204 for scanning a user's eye to establish the user's identity. Optionally at step 302, a user may be instructed (thought on screen displays or other means, such as audio signals) to position their eye at a certain location and open their eyes wide to allow the camera(s) of the see-though head-mounted display a clear view of the iris. At 304, one or more images of the user's eyes are made using the see-though head-mounted display cameras. At 306 iris recognition processing is performed. An exemplary method is shown in FIG. 3A. At 308, a pattern determination algorithm is used to determine a pattern in the user's iris to a degree of accuracy required by the system. In one embodiment, as basic pattern is detected in order to allow the system to distinguish between a small number of users. In an alternative embodiment, a more detailed level of accuracy is utilized to further distinguish between a larger number of users. At 310, the pattern is output to a pattern matching engine to allow the pattern to be matched to a user profile.

Figure 3B:
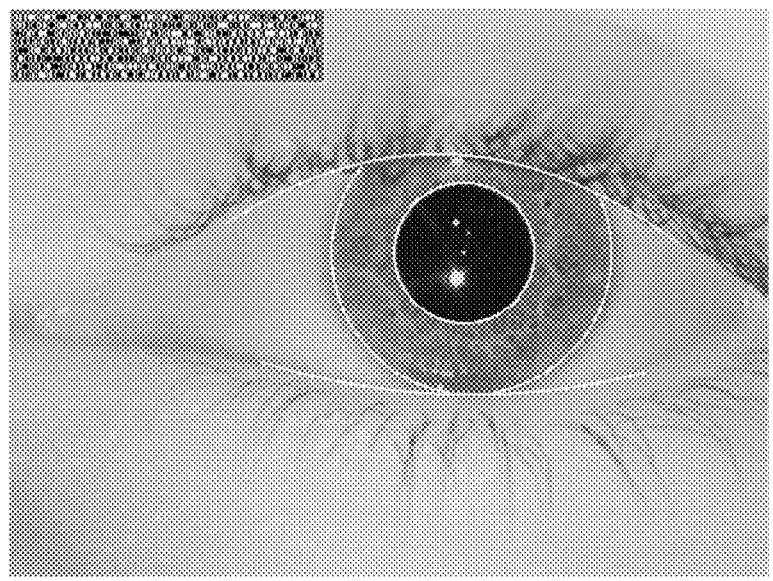
FIG. 3B illustrates images of the iris of an eye.

FIG. 3B is a depiction of a user iris. Iris scanning uses pattern-recognition techniques of images of an individual's eyes. In the present technology, iris recognition the camera systems and illumination sources of the see-though head-mounted display embodiments discussed below create images of the iris. These images can be converted into patterned representations of the iris to identify a user. Visible or infrared imaging techniques may be used.

Figure 3C:
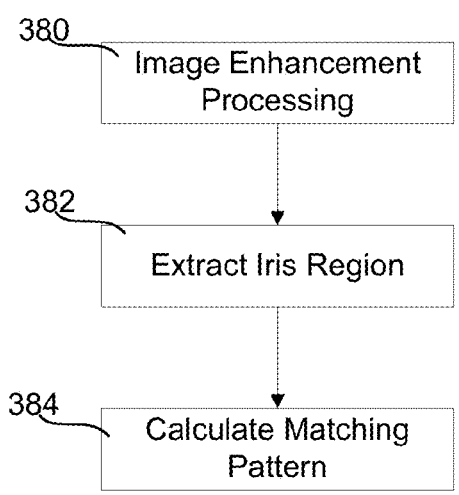
FIG. 3C is a flowchart depicting a process for iris scan recognition.

FIG. 3C is a flowchart depicting a process for iris recognition. At 380, image enhancement processing occurs. Image capture devices in a see-through head-mounted display as discussed herein may acquire images of a user's eye(s). The images may then be processed to enhance contrast, reduce noise, and remove elements from the image that are not necessary for recognition. At 382, the iris region is isolated. Generally, methods for localization of the iris systems make use of first derivatives of image intensity to signal the location of edges that correspond to the borders of the iris. Generally, any of a number of iris-recognition algorithms may be utilized to identify the approximately concentric circular outer boundaries of the iris and the pupil in a photo of an eye. Generally, the inner boundary of the iris, forming the pupil, can be determined by exploiting the fact that the boundary of the pupil is essentially a circular edge. The pupil is generally dark while the iris is lighter, with varied pigmentation. Methods for detecting a pupillary boundary check for an abrupt and sudden change in brightness when summed along a circle. In one embodiment, the contour integral of an ellipse within the pupil is calculated and the integral derivative in an axial direction of the ellipse is computed for increasing lengths of the axes. The same method may be used to detect the eyelid boundary.

The set of pixels covering only the iris is then transformed into a pattern that preserves the information that is essential for a statistically meaningful comparison between two iris images. To authenticate via identification (one-to-many template matching) or verification (one-to-one template matching), a template created by imaging the iris is compared to a stored value template in a database.

At 384, a matching pattern is calculated using one or more algorithms. Pattern matching comprises bringing the newly acquired iris pattern into spatial alignment with a candidate data base entry, choosing a representation of the aligned iris patterns that makes their distinctive patterns apparent, evaluating the goodness of match between the candidate and data base representations, and deciding on the success of match. There exist many alternative methods for finding and tracking facial features such as the eyes. Various techniques of iris recognition are described in: U.S. Pat. No. 7,336,806, U.S. Pat. No. 6,641,349, and U.S. Pat. No. 5,291,560 and Daugman, *How Iris Recognition Works*, IEEE TRANSACTIONS ON CIRCUITS AND SYSTEMS FOR VIDEO TECHNOLOGY, VOL. 14, NO. 1, JANUARY 2004, each of which is entirely and specifically incorporated by reference into the present description.

Figure 4:
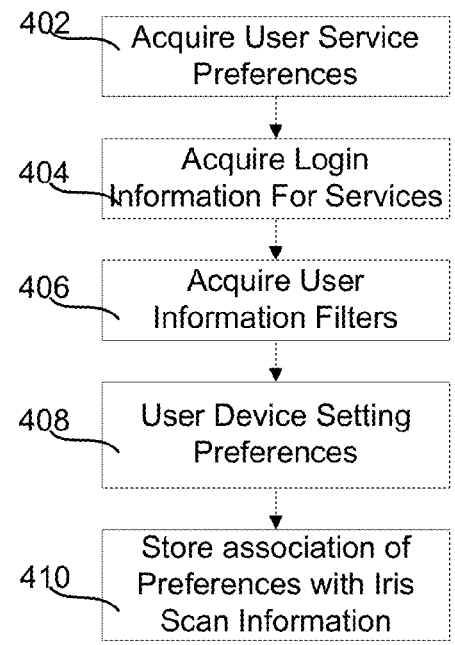
FIG. 4 is a flowchart illustrating a procedure for creating user profile.

FIG. 4 is a flowchart illustrating creation and updating of a user profile 280. It should be understood that creation of a user profile may allow for the storing of any number of parameters for which a service provider wishes to allow configuration. Each of the steps illustrated in FIG. 4 may be performed separately and asynchronously to create a user profile. That is, each step may be performed to create or add to an existing user profile. At 402, if a user has specified service preferences for one or more of the augmented reality services, the user service preferences can be stored. For example, if the user subscribes to an information feed for the see-though head-mounted display for an event based information system, the user may wish to limit the type of information presented in the feed of the service. User preferences regarding the service are stored in the user profile 280 of the user at 402. At 404 when a user provides credentials allowing the user to log into one of a number of services, the login credentials can be stored with the user profile 280 and automatically retrieved based on a determination of user identity. At 406, information filters designated by the user relative to information provided by the augmented reality service provider 90 are stored in the user profile 280. Information filters limit the amount and type of information which may be presented to the user in the see-though head-mounted display and may be defined by the user as information is provided to the user. For example, when information of a particular type is displayed by an augmented reality service, a user may indicate that information of that type should not be displayed by the service in the future. One type of information may comprise traffic alerts or advertisements relating to a particular type of product. Once an indication that the type of information should not be displayed is made by the user, a filter is created and profile 280 can store the filter.

Device setting preferences may be set at 408. As noted above, the system can use the user identity to automatically adjust the see-though head-mounted display and augmented reality service to the user's stored preferences. In one aspect, the user profile can be used to automatically adjust the inter-pupillary distance of the display elements of the see through head mounted display 150. The see-though head-mounted display allows for automatic adjustment of the IPD and may include a vertical and/or height dimension, and/or a depth distance from a display optical system to a respective eye.

FIG. 5A is a flowchart illustrating a method for setting a configuration based on a user profile at 210 wherein the configuration is for adjusting a see-through, near-eye, mixed reality display device for alignment with an inter-pupillary distance (IPD) of one or more users, and thereafter operating the device at 214. In step 542, an initial determination is made as to whether the display is aligned with a user IPD as defined in the user profile. In step 542, one or more processors of the control circuitry 136, e.g. processor 210 in FIG. 7A below, the processing unit 6, 5, the hub computing system 12 or a combination of these automatically determines whether a see-through, near-eye, mixed reality display device is aligned with an IPD of a user in accordance with an alignment criteria. If it is determined the see-through, near-eye, mixed reality display device is in alignment with a user IPD, the method moves to step 548 and monitors for changes in the alignment.

If the display is not aligned, then in step 544 an IPD is selected from a user profile for the identified user.

A display device 2 (examples of which are shown in FIG. 7A, 7B) has a display optical system (e.g., 14L and 14R of FIG. 8A) for each eye, and in some embodiments, the one or more processors store the IPD as a predetermined distance between the optical axes of the display optical systems (e.g., 14L and 14R of FIG. 8A) at positions which satisfy the alignment criteria. In some embodiments, the one or more processors store the position of each optical axis in the IPD data set in a user profile. The IPD for a user may be asymmetrical, for example with respect to the user's nose. For instance, the left eye is a little closer to the nose than the right eye is. In one example, adjustment values of a display adjustment mechanism for each display optical system from an initial position may be saved in the IPD data set in a user profile. The initial position of the display adjustment mechanism may have a fixed position with respect to a stationary frame portion, for example a point on the bridge 104. Based on this fixed position with respect to the stationary frame portion, and the adjustment values for one or more directions of movement, a position of each optical axis with respect to the stationary frame portion may be stored as a pupil alignment position for each display optical system. Additionally, in the case of the stationary frame portion being a point on the bridge, a position vector of the respective pupil to the user's nose may be estimated for each eye based on the fixed position to the point on the bridge and the adjustment values. The two position vectors for each eye provide at least horizontal distance components, and can include vertical distance components as well. An inter-pupillary distance IPD in one or more directions may be derived from these distance components. (It is to be noted that within this disclosure, the exemplary embodiments of the display device 2 having the respective display optical systems, e.g., 14L and 14R for the left and right eyes respectively will be referred to by slightly different nomenclature such as "near-eye display 2", "near-eye display unit 2", "display device 2", and "mixed reality device 2" where said nomenclature is to be understood to be referring to substantially the same concept.)

In step 545, one or more adjustment values are retrieved from the IPD data set determined for the at least one display adjustment mechanism for satisfying the alignment criteria for at least one display optical system. At step 546, the processing unit 20 causes a display adjustment mechanism, such as mechanism 203 discussed with respect to FIGS. 8A-8C, to automatically adjust a display optical system 14 (composed of 14L and 14R) for each eye for alignment with the selected IPD in step 546. Alternatively, the user may be instructed on adjustments to be made to the see through head mounted display manually.

At 547, additional user preferences such as service preferences, login information for services, and information filters are retrieved from the user profile.

In step 548, the device is operated in accordance with user preferences. At 548 a change may be detected by the processing unit 20 indicating the alignment with the selected IPD no longer satisfies an alignment criteria which triggers the processor in step 550 to automatically re-adjust at least one of the display optical systems for satisfying the alignment criteria. The alignment criteria may be a distance of a few millimeters, e.g. 3 mm. A gaze determination method, which is continually being done for tracking the focus of the user may detect the change.

FIG. 5B is a flowchart illustrating one embodiment of a method 408 creating a user profile entry for user settings which can then automatically provide adjustable IPD alignment when operating a device 14 (composed of 14L and 14R) for one or more users of a see-through, near-eye, mixed reality display. In step 518, the processing unit 20 automatically determines an IPD of a user based on captured data of reflected light from each eye, and in step 520, stores the IPD data associated with the user in the user profile. At 546 of FIG. 5B, the see-though head-mounted display automatically adjusts a display optical system for each eye of the display based on the determined IPD. At 519, one or more adjustment values are determined relative to the IPD and the particular characteristics of the user. As IPD data and adjustments are generally fixed for adults, due to the confines of the human skull, IPD data may be determined once and stored at 520. Once the display is adjusted at 546 of FIG. 5B, the method completes step 410 of storing the IPD data set and user preferences, and the method of FIG. 5B completes with steps 214 and 216 of FIG. 2.

Various methods for determining and storing an IPD are disclosed in co-pending application Ser. No. 13/221,662. In an alternative embodiment, where the user profile stores a near IPD and a far IPD, the processing unit 20 determines a distance of a point of gaze based on gaze data, and selects as the IPD either a near IPD or a far IPD based on the distance of the point of gaze.

Figure 6A:
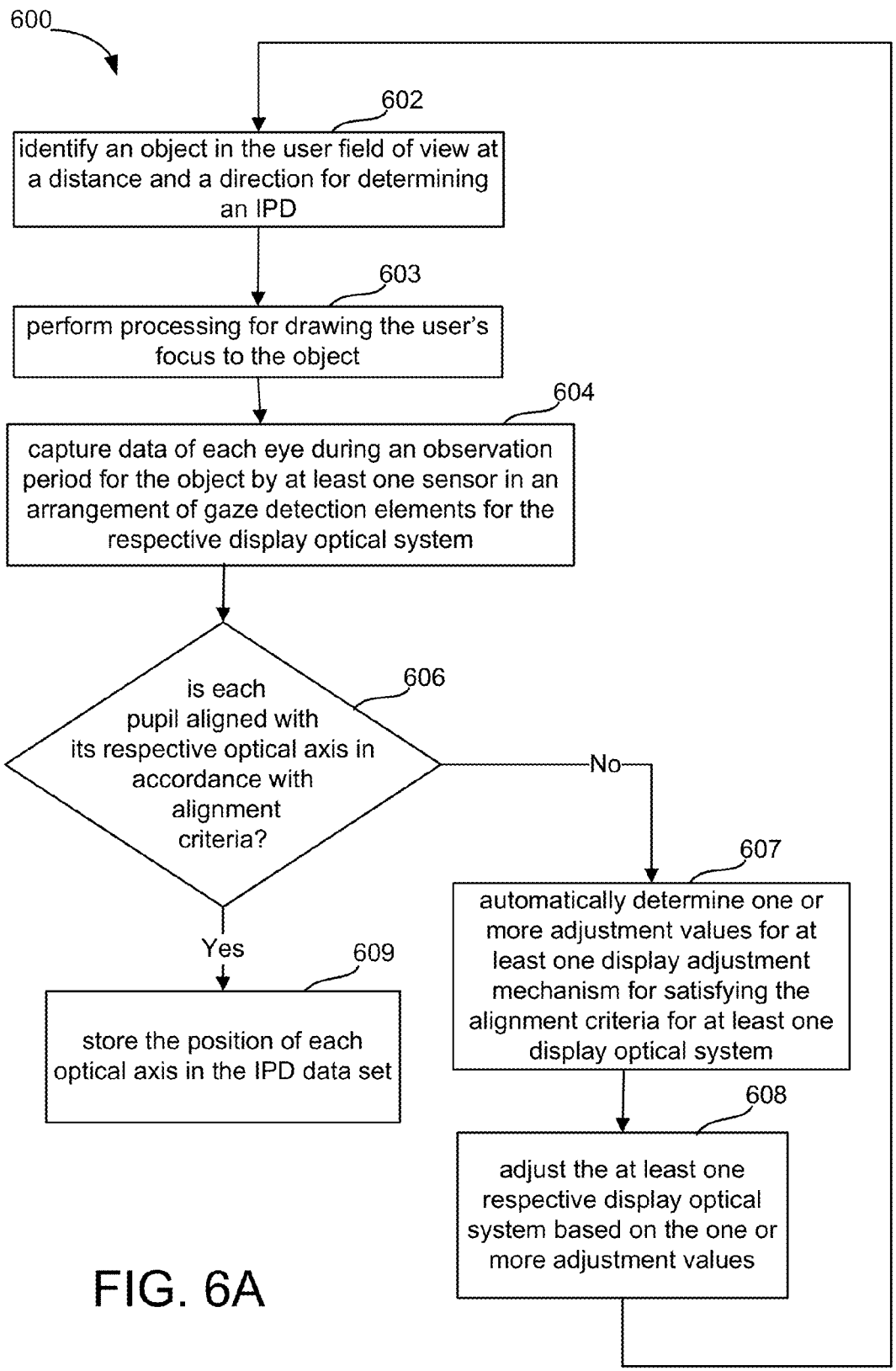
FIG. 6A is a flowchart of a method for automatically determining an IPD of a user based on captured data.
Figure 6B:
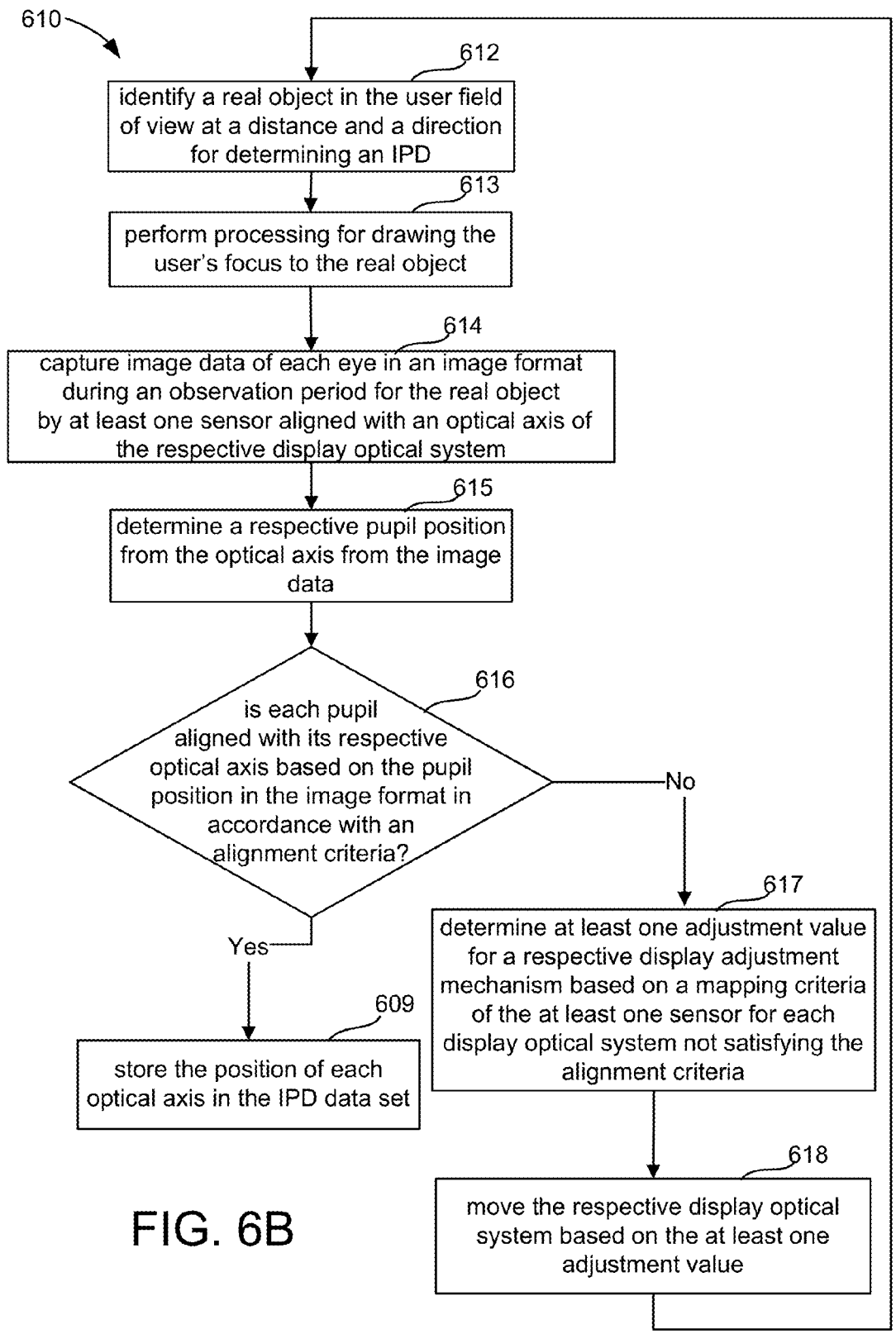
FIG. 6B illustrates a method of aligning a see-through, near-eye, mixed reality display device with an IPD of a user based on image data of a pupil for each eye in an image format.
Figure 6C:
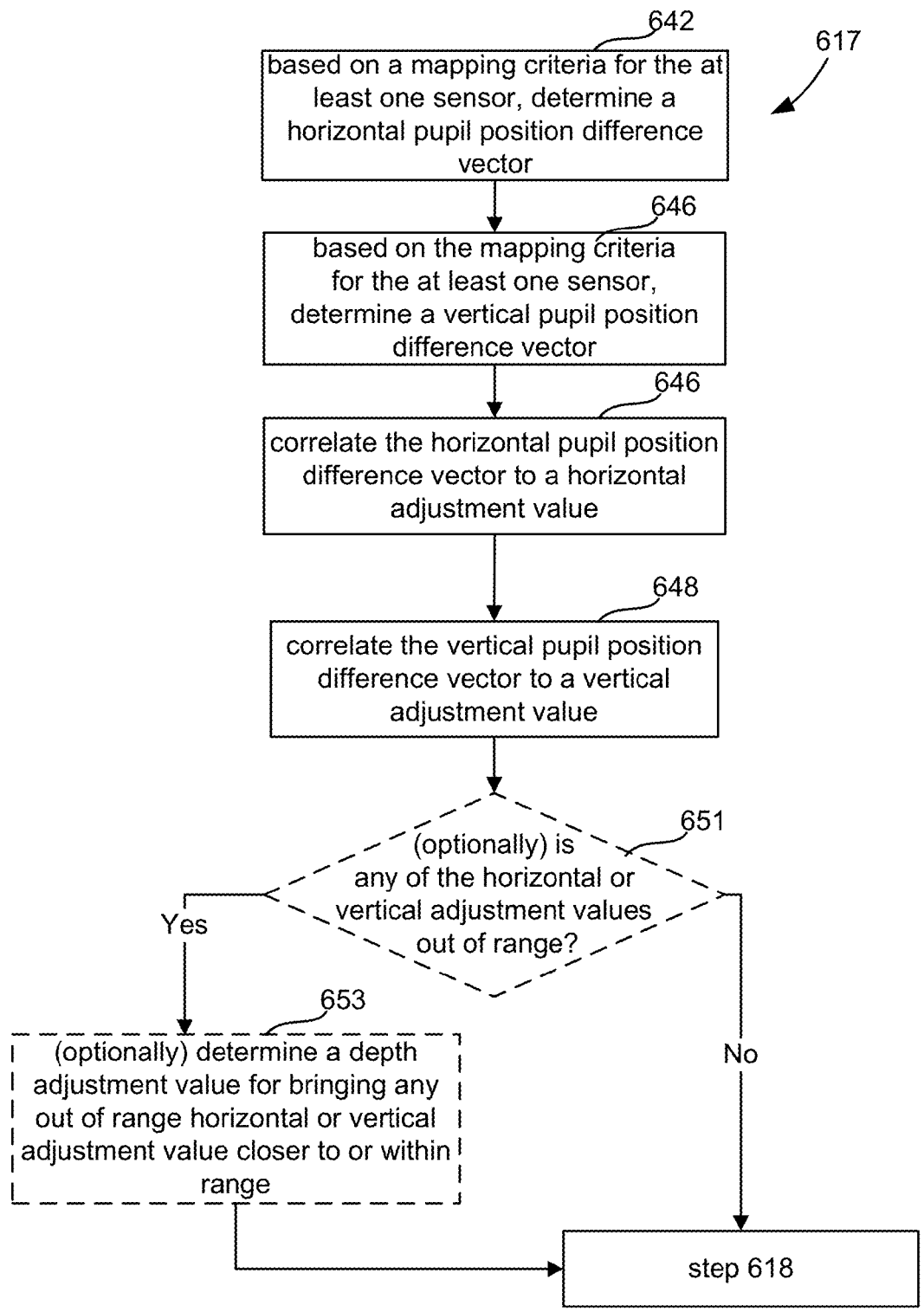
FIG. 6C is a flowchart of a process for determining at least one adjustment value.

FIG. 6A-6C illustrate methods for aligning a see-through, near-eye, mixed reality display with an IPD.

FIG. 6A is a flowchart of a method embodiment 600 for aligning a see-through, near-eye, mixed reality display with an IPD. Steps 602 to 606 illustrate more details of an example of step 542 for automatically determining whether a see-through, near-eye, mixed reality display device is aligned with an IPD of a user in accordance with an alignment criteria. Steps 607 to 608 illustrate more detailed steps of an example for adjusting the display device for bringing the device into alignment with the user IPD as in step 548. As discussed for FIG. 3C, the adjustment may be automatically performed by the processor or instructions electronically provided to the user for mechanical adjustment.

With reference to FIG. 6A and the embodiments disclosed in FIGS. 8A-10D, bellow, in step 602, the one or more processors of the see-through, near-eye, mixed reality system such as processor 210 of the control circuitry, that in processing unit 4, the mobile device 5, or the hub computing system 12, alone or in combination, identify an object in the user field of view at a distance and a direction for determining an IPD. For the far IPD, the distance is at effective infinity, e.g. more than 5 feet, the direction is straight ahead with respect to the optical axis of each display optical system. In other words, the distance and direction are such that when each pupil is aligned with each optical axis, the user is looking straight ahead. In step 603, the one or more processors perform processing for drawing the user's focus to the object. In one example, the one or more processors electronically provide instructions requesting the user to look at the identified real object. In some instances, the user may be asked simply to look straight ahead.

In step 604, the at least one sensor such as sensor 134r or the photodetectors 152 or both in an arrangement of gaze detection elements for the respective display optical system capture data for each eye during an observation period for the object. In one example, the captured data may be IR image data and glints reflecting from each eye captured by an IR camera. In other examples, the at least one sensor is an IR sensor like a position sensitive detector. The at least one sensor may also be the IR photodetectors. In some examples, the at least one sensor may be a visible light camera.

In step 606, the one or more processors determine based on the captured data and the arrangement of the gaze detection elements whether each pupil is aligned with the optical axis of its respective display optical system in accordance with an alignment criteria. An alignment criteria may be a distance from the optical axis, e.g. 2 millimeters (mm). If so, the display device 2 has been aligned with each pupil and hence the IPD, and the one or more processors in step 609 store the position of each optical axis in the IPD data set.

If the alignment criteria is not satisfied, then in step 607, the one or more processors automatically determine one or more adjustment values for at least one display adjustment mechanism for satisfying the alignment criteria for at least one display optical system. By "automatically determines" means the one or more processors determine the values without a user identifying the adjustment values through mechanical manipulation. In many embodiments, based on stored device configuration data, the current position of the optical axis with respect to a fixed point of the support structure is tracked. In step 608, the processor causes adjustment of the at least one respective display optical system based on the one or more adjustment values. In automatic adjustment, the one or more processors control the at least one display adjustment mechanism 203 via the one or more display adjustment mechanism drivers 245 to move the at least one respective display optical system based on the one or more adjustment values. In the mechanical adjustment approach, the processor electronically provides instructions to the user for applying the one or more adjustment values to the at least one display adjustment mechanism via a mechanical controller. The steps of the method embodiment may be repeated a predetermined number of times or until the alignment criteria is satisfied.

FIG. 6B is a flowchart of a method embodiment 610 for an implementation example of aligning a see-through, near-eye, mixed reality display device with an IPD of a user based on image data of a pupil for each eye in an image format. The image format has a predetermined size and shape, for example as may be set by an image sensor size and shape. An example of an image format is an image frame. The format is to provide a coordinate system, e.g. a center as an origin, for tracking a position within the image data. When the detection area of an image sensor, e.g. an IR camera, or visible light camera if desired, is centered on the optical axis 142 of a display optical system 14, the image data in the image format is centered on the optical axis 142. How far off a pupil center is from the image center is a basis for determining whether the pupil is satisfactorily aligned with the optical axis.

In step 612, a real object is identified in the user field of view at a distance and a direction for determining an IPD, and in step 613, the one or more processors perform processing for drawing the user's focus to the real object. In step 614, image data of each eye is captured in an image format during an observation period for the real object by at least one sensor aligned with an optical axis of the respective display optical system. A respective pupil position with respect to the respective optical axis is determined from the image data in step 615. A pupil area in the image data may be identified by thresholding intensity values. An ellipse fitting algorithm may be applied for approximating the size and shape of the pupil, and a center of a resulting ellipse may be selected as the center of the pupil. Ideally, the center of the pupil is aligned with the optical axis of the display optical system. In step 616, the one or more processors determine whether each pupil is aligned with the respective optical axis based on the pupil position in the image format, e.g. image frame, in accordance with an alignment criteria. In the case in which the detection area 139 is centered on the optical axis 142, the one or more processors determine whether the pupil position is centered in the image format, e.g. centered in the image frame, in accordance with an alignment criteria. The pupil position may be determined in horizontal and vertical directions for each eye with respect to the optical axis.

If the alignment criteria is satisfied, the one or more processors in step 609 store the position of each optical axis in the IPD data set. If not, in step 617, the one or more processors determine at least one adjustment value for a respective display adjustment mechanism based on a mapping criteria of the at least one sensor for each display optical system not satisfying the alignment criteria. In step 618, the one or more processors control the respective display adjustment mechanism to move the respective display optical system based on the at least one adjustment value. The steps of the method embodiment may be repeated a predetermined number of times or until the alignment criteria is satisfied.

FIG. 6C is a flowchart of a method embodiment which may be used for implementing step 617 for determining at least one adjustment value. In step 642, based on a mapping criteria for the at least one sensor, the one or more processors determine a horizontal pupil position difference vector. A pixel to distance mapping criteria may be used for each direction for which adjustment is provided. The mapping criteria may be different for vertical than for horizontal depending on the shape of the detection area of the image sensor. In step 644, based on the mapping criteria for the at least one sensor, a vertical pupil position difference vector is determined as well. In step 646, the one or more processors correlate the horizontal pupil position difference vector to a horizontal adjustment value, and in step 648, correlate the vertical pupil position difference vector to a vertical adjustment value.

As the horizontal IPD may have a range between 25 to 30 mm, a display adjustment mechanism may have a range limit of distance to move a display optical system in any direction. A depth adjustment may assist with bringing an out of range adjustment value in the horizontal or vertical direction to being within range. Optional steps 651 and 653 may be performed. The one or more processors determine in optional step 651 whether any of the horizontal or vertical adjustment values are out of range. If not, alignment of the display optical system can be accomplished by movement in a two dimensional plane, and step 618 may be performed. If at least one adjustment value is out of range, the one or more processors determine in optional step 653 a depth adjustment value for bringing any out of range horizontal or vertical adjustment value closer to or within the range limit, and step 618 may be performed to adjust the display optical system.

As an illustrative example, if the optical axis is 12 mm to the right and the display adjustment mechanism can only move the display optical system 6 mm to the left, by increasing the depth between the display optical system and the pupil, the angle from the pupil when looking straight ahead to the position of the optical axis decreases, so a depth increase in combination with the 6 mm adjustment to the left brings the optical axis closer to aligning with the pupil in accordance with an alignment criteria. The effect of the depth change on the vertical dimension may also be taken into account so a vertical adjustment may also be necessary or the depth adjustment value modified.

The embodiments of FIGS. 6B and 6C may also be applied for glint data from each eye when the glints have a geometrical relationship to one another, and the sensor has a surface of discrete sensors such as pixels. For example, the glints for an eye generated by the illuminators form a box or other geometric shape aligned with the optical axis of the respective display optical system for the eye by the positions of the illuminators. If the sensor is a position sensitive detector (PSD) for detecting glints, a position on the sensor and the intensity value detected for a glint generated from a fixed illuminator are used to map a position of the pupil. Image data from an IR camera, or even a visible camera, provides greater accuracy for pupil position determination, but the glint data approach processes less data and is therefore computationally less intensive.

Other embodiments may employ implementations for aligning a see-through, near-eye, mixed reality display with an IPD based on gaze data. In such embodiments, the one or more processors determine a reference gaze vector for each eye to the real object which passes through the optical axis of a respective display optical system based on an arrangement of gaze detection elements for the display optical system. Embodiments for gaze determination methods are discussed in application Ser. No. 13/221,662.

The aforementioned methods may be used when glint data is used to determine gaze. In one embodiment, glint reflections can estimate gaze based on a few data points of the intensity values detected for the glints, rather than processing much, much larger sets of image data of eyes. The position of the illuminators 153 on the eyeglass frame 115 or other support structure of a near-eye display device may be fixed so that the position of glints detected by one or more sensors is fixed in the sensor detection area.

FIG. 7A is a block diagram depicting example components of one embodiment of a see-through, mixed reality display device with adjustable IPD in a system environment in which the device may operate. System 10 includes a see-through display device as a near-eye, head mounted display device 150 in communication with processing unit 4 via wire 6. In other embodiments, head mounted display device 150 communicates with processing unit 4 via wireless communication. Head mounted display device 150, which in one embodiment is in the shape of eyeglasses in a frame 115, is worn on the head of a user so that the user can see through a display, embodied in this example as a display optical system 14 for each eye, and thereby have an actual direct view of the space in front of the user.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, on the display that are viewable by the person wearing the see-through display device while that person is also viewing real world objects through the display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor or goggles. The frame 115 includes a temple or side arm for resting on each of a user's ears. Temple 102 is representative of an embodiment of the right temple and includes control circuitry 136 for the display device 150. Nose bridge 104 of the frame includes a microphone 110 for recording sounds and transmitting audio data to processing unit 4.

In one embodiment, processing unit 4 is worn on the user's wrist and includes much of the computing power used to operate see-through head-mounted display 150. Processing unit 4 may communicate wirelessly (e.g., WiFi, Bluetooth, infra-red, or other wireless communication means) to one or more hub computing systems 12.

Hub computing system 10 may be a computer, a gaming system or console, or the like. According to an example embodiment, the hub computing system 10 may include hardware components and/or software components such that hub computing system 10 may be used to execute applications such as gaming applications, non-gaming applications, or the like. In one embodiment, hub computing system 10 may include a processor such as a standardized processor, a specialized processor, a microprocessor, or the like that may execute instructions stored on a processor readable storage device for performing the processes described herein.

Hub computing system 10 further includes one or more capture devices, such as capture devices 21A and 21B. In other embodiments, more or less than two capture devices can be used to capture the room or other physical environment of the user.

Capture devices 21A and 21B may be, for example, cameras that visually monitor one or more users and the surrounding space such that gestures and/or movements performed by the one or more users, as well as the structure of the surrounding space, may be captured, analyzed, and tracked to perform one or more controls or actions within an application and/or animate an avatar or on-screen character. An application may be executing on hub computing system 10, the display device 150, as discussed below on a mobile device 5 or a combination of these.

Hub computing system 10 may be connected to an audiovisual device 11 such as a television, a monitor, a high-definition television (HDTV), or the like that may provide game or application visuals. For example, hub computing system 10 may include a video adapter such as a graphics card and/or an audio adapter such as a sound card that may provide audiovisual signals associated with the game application, non-game application, etc. The audiovisual device 11 may receive the audiovisual signals from hub computing system 10 and may then output the game or application visuals and/or audio associated with the audiovisual signals. According to one embodiment, the audiovisual device 11 may be connected to hub computing system 10 via, for example, an S-Video cable, a coaxial cable, an HDMI cable, a DVI cable, a VGA cable, component video cable, RCA cables, etc. In one example, audiovisual device 11 includes internal speakers. In other embodiments, audiovisual device 11, a separate stereo or hub computing system 10 is connected to external speakers 22.

FIG. 7B is a block diagram depicting example components of another embodiment of a see-through, mixed reality display device with adjustable IPD. In this embodiment, the see-through head-mounted display 150 communicates with a mobile computing device 5 as an example embodiment of the processing unit 4. In the illustrated example, the mobile device 5 communicates via wire 6, but communication may also be wireless in other examples.

Furthermore, as in the hub computing system 10, gaming and non-gaming applications may execute on a processor of the mobile device 5 which user actions control or which user actions animate an avatar as may be displayed on a display 7 of the device 5. The mobile device 5 also provides a network interface for communicating with other computing devices like hub computing system 10 over the Internet or via another communication network via a wired or wireless communication medium. For example, the user may participate in an online gaming session with other mobile device users and those playing on more powerful systems like hub computing system 10. Examples of hardware and software components of a mobile device 5 such as may be embodied in a smartphone or tablet computing device are described in FIG. 20. Some other examples of mobile devices 5 are a laptop or notebook computer and a netbook computer.

Figure 8A:
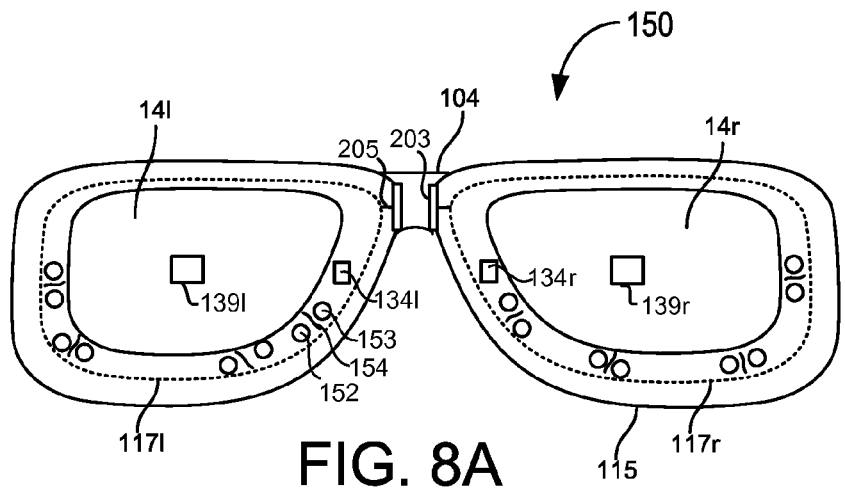
FIG. 8A illustrates an exemplary arrangement of a see through, see-through head-mounted display embodied as eyeglasses with movable display optical systems including gaze detection elements.

FIG. 8A illustrates an exemplary arrangement of a see through, see-through head-mounted display embodied as eyeglasses with movable display optical systems including gaze detection elements. What appears as a lens for each eye represents a display optical system 14 for each eye, e.g. 14r and 14l. A display optical system includes a see-through lens, e.g. 116, 118 in FIGS. 7A, 7b, 9A-9B and 10A, 10B, as in an ordinary pair of glasses, but also contains optical elements (e.g. mirrors, filters) for seamlessly fusing virtual content with the actual direct real world view seen through the lenses 116, 118. A display optical system 14 has an optical axis which is generally in the center of the see-through lens 116, 118 in which light is generally collimated to provide a distortionless view. For example, when an eye care professional fits an ordinary pair of eyeglasses to a user's face, a goal is that the glasses sit on the user's nose at a position where each pupil is aligned with the center or optical axis of the respective lens resulting in generally collimated light reaching the user's eye for a clear or distortionless view.

In the example of FIG. 8A, a detection area 139r, 139l of at least one sensor is aligned with the optical axis of its respective display optical system 14r, 141 so that the center of the detection area 139r, 139l is capturing light along the optical axis. If the display optical system 14 is aligned with the user's pupil, each detection area 139 of the respective sensor 134 is aligned with the user's pupil. Reflected light of the detection area 139 is transferred via one or more optical elements to the actual image sensor 134 of the camera.

In one example, a visible light camera also commonly referred to as an RGB camera may be the sensor, and an example of an optical element or light directing element is a visible light reflecting mirror which is partially transmissive and partially reflective. In some examples, a camera may be small, e.g. 2 millimeters (mm) by 2 mm. In other examples, the at least one sensor 134 is an IR camera or a position sensitive detector (PSD) to which the IR radiation may be directed. For example, a hot reflecting surface may transmit visible light but reflect IR radiation. In some examples, sensor 134 may be a combination of an RGB and an IR camera, and the light directing elements may include a visible light reflecting or diverting element and an IR radiation reflecting or diverting element.

In the example of FIG. 8A, there are four sets of an illuminator 153 paired with a photodetector 152 and separated by a barrier 154 to avoid interference between the incident light generated by the illuminator 153 and the reflected light received at the photodetector 152. To avoid unnecessary clutter in the drawings, drawing numerals are shown with respect to a representative pair. Each illuminator may be an infra-red (IR) illuminator which generates a narrow beam of light at a predetermined wavelength. Each of the photodetectors may be selected to capture light at the predetermined wavelength. Infra-red may also include near-infrared.

As described below, in some embodiments which calculate a cornea center as part of determining a gaze vector, two glints, and therefore two illuminators will suffice. However, other embodiments may use additional glints in determining a pupil position and hence a gaze vector. As glint and eye data is repeatedly captured, for example at 30 frames a second or greater, data for one glint may be blocked by an eyelid or even an eyelash, but data may be gathered by a glint generated by another illuminator.

In FIG. 8A, each display optical system 14 and its arrangement of gaze detection elements facing each eye such as camera 134 and its detection area 139, optical alignment elements (not shown in this figure; see 6A-6D below), the illuminators 153 and photodetectors 152 are located on a movable inner frame portion 117l, 117r. In this example, a display adjustment mechanism comprises one or more motors 203 having a shaft 205 which attaches to an object for pushing and pulling the object in at least one of three dimensions. In this example, the object is the inner frame portion 117 which slides from left to right or vise versa within the frame 115 under the guidance and power of shafts 205 driven by motors 203. In other embodiments, one motor 203 may drive both inner frames. As discussed with reference to FIGS. 9A and 9B, a processor of control circuitry 136 of the display device 150 is able to connect to the one or more motors 203 via electrical connections within the frame 115 for controlling adjustments in different directions of the shafts 205 by the motors 203. Furthermore, the motors 203 access a power supply via the electrical connections of the frame 115 as well.

Figure 8B:
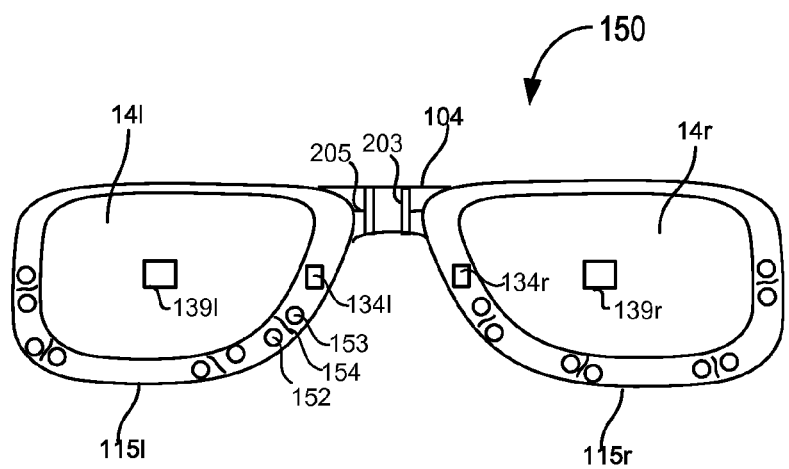
FIG. 8B illustrates another exemplary arrangement of a see through, see-through head-mounted display embodied as eyeglasses with movable display optical systems including gaze detection elements.

FIG. 8B illustrates another exemplary arrangement of a see through, see-through head-mounted display embodied as eyeglasses with movable display optical systems including gaze detection elements. In this embodiment, the each display optical system 14 is enclosed in a separate frame portion 115l, 115r, e.g. a separate eyeglass framed section, which is movable individually by the motors 203. In some embodiments, the movement range in any dimension is less than 10 millimeters. In some embodiments, the movement range is less than 6 millimeters depending on the range of frame sizes offered for a product. For the horizontal direction, moving each frame a few millimeters left or right will not impact significantly the width between the eyeglass temples, e.g. 102, which attach the display optical systems 14 to the user's head.

Figure 8C:
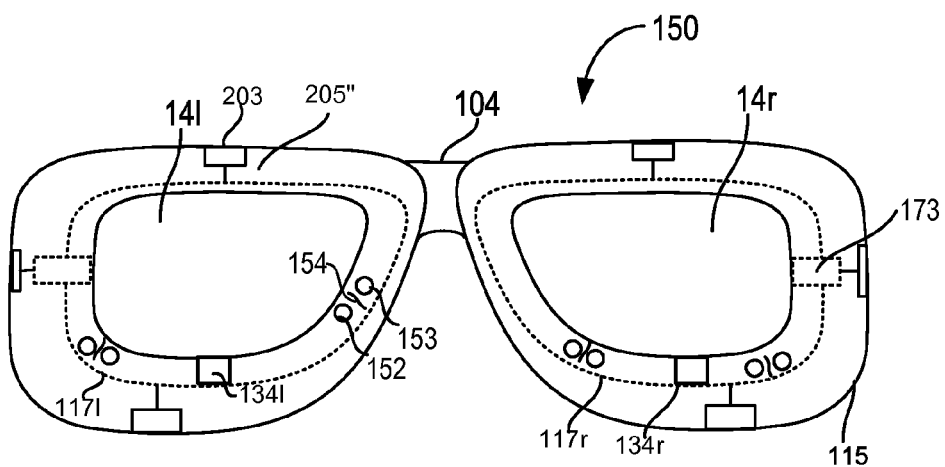
FIG. 8C illustrates yet another exemplary arrangement of a see through, see-through head-mounted display embodied as eyeglasses with movable display optical systems including gaze detection elements.

FIG. 8C illustrates another exemplary arrangement of a see through, see-through head-mounted display embodied as eyeglasses with movable display optical systems including gaze detection elements. In this example, the sensor 134r, 134l itself is in line or aligned with the optical axis at the center of its respective display optical system 14r, 14l but located on the frame 115 below the system 14. Additionally, in some embodiments, the camera 134 may be a depth camera or include a depth camera In this example, there are two sets of illuminators 153 and photodetectors 152.

An inter-pupillary distance may describe the distance between a user's pupils in a horizontal direction, but vertical differences may also be determined. Additionally, moving a display optical system in a depth direction between the eye and the display device 150 may also assist in aligning the optical axis with the user's pupil. A user may actually have different depths of their eyeballs within the skull. Movement of the display device in the depth direction with respect to the head may also introduce misalignment between the optical axis of the display optical system 14 and its respective pupil.

In this example, the motors form an example of a XYZ mechanism for moving each display optical system 14 in three dimensions. The motors 203 in this example are located on the outer frame 115 and their shafts 205 are attached to the top and bottom of the respective inner frame portion 117. The operation of the motors 203 are synchronized for their shaft movements by the control circuitry 136 processor 210. Additionally, as this is a mixed reality device, each microdisplay assembly 173 for generating images of virtual objects or virtual images for display in the respective display optical system 14 is moved by a motor and shaft as well to maintain optical alignment with the display optical system. Examples of microdisplay assemblies 173 are described further below. In this example, the motors 203 are three axis motors or can move their shafts in three dimensions. For example, the shaft may be pushed and pulled in one axis of direction along a center of a cross-hair guide and move in each of two perpendicular directions in the same plane within the perpendicular openings of the cross-hair guide.

FIG. 9A is a side view of an eyeglass temple 102 of the frame 115 in an embodiment of a see-through, mixed reality display device providing support for hardware and software components. At the front of frame 115 is physical environment facing video camera 113 that can capture video and still images. Particularly in embodiments where the display device 150 is not operating in conjunction with depth cameras like capture devices 21a and 21b of the hub system 12, the physical environment facing camera 113 is a depth camera as well as a visible light sensitive camera. For example, the depth camera may include an IR illuminator transmitter and a hot reflecting surface like a hot mirror in front of the visible image sensor which lets the visible light pass and directs reflected IR radiation within a wavelength range transmitted by the illuminator to a CCD or other type of depth sensor. The data from the sensors may be sent to a processor 210 of the control circuitry 136, or the processing unit 6, 5 or both which may process them but which the unit 6,5 may also send to a computer system over a network or hub computing system 12 for processing. The processing identifies objects through image segmentation and edge detection techniques and maps depth to the objects in the user's real world field of view. Additionally, the physical environment facing camera 113 may also include a light meter for measuring ambient light.

Control circuits 136 provide various electronics that support the other components of head mounted display device 150. More details of control circuits 136 are provided below with respect to FIG. 11. Inside, or mounted to temple 102, are ear phones 130, inertial sensors 132 GPS transceiver 144 and temperature sensor 138. In one embodiment inertial sensors 132 include a three axis magnetometer 132A, three axis gyro 132B and three axis accelerometer 132C (See FIG. 11). The inertial sensors are for sensing position, orientation, and sudden accelerations of head mounted display device 150. From these movements, head position may also be determined.

The display device 150 provides a type of display element which can generate an image of one or more virtual objects. In some embodiments a microdisplay may be used as the display element. A microdisplay assembly 173 in this example comprises light processing elements and a variable focus adjuster 135. An example of a light processing element is a microdisplay unit 120. Other examples include one or more optical elements such as one or more lenses of a lens system 122 and one or more reflecting elements such as surfaces 124, 124a and 124b in FIGS. 10A to 10D. Lens system 122 may comprise a single lens or a plurality of lenses.

Mounted to or inside temple 102, the microdisplay unit 120 includes an image source and generates an image of a virtual object. The microdisplay unit 120 is optically aligned with the lens system 122 and the reflecting surface 124 or reflecting surfaces 124a and 124b as illustrated in the following figures. The optical alignment may be along an optical axis 133 or an optical path 133 including one or more optical axes. The microdisplay unit 120 projects the image of the virtual object through lens system 122, which may direct the image light, onto reflecting element 124 which directs the light into lightguide optical element (126) as in FIGS. 10C and 10D or onto a partially reflecting element 124b as in FIG. 10A or onto a reflecting surface 124a (e.g. a mirror or other surface) which then directs the light of the virtual image to a partially reflecting element 124b as in FIG. 10B) which combines the virtual image view provided along path 133 with the natural or actual direct view along the optical axis 142 as in FIGS. 10A-10D. The combination of views are directed into a user's eye.

The variable focus adjuster 135 changes the displacement between one or more light processing elements in the optical path of the microdisplay assembly or an optical power of an element in the microdisplay assembly. The optical power of a lens is defined as the reciprocal of its focal length, e.g. 1/focal length, so a change in one effects the other. The change results in a change in the region of the field of view, e.g. a region at a certain distance, which is in focus for an image generated by the microdisplay assembly 173.

In one example of the microdisplay assembly 173 making displacement changes, the displacement changes are guided within an armature 137 supporting at least one light processing element such as the lens system 122 and the microdisplay 120 in this example. The armature 137 helps stabilize the alignment along the optical path 133 during physical movement of the elements to achieve a selected displacement or optical power. In some examples, the adjuster 135 may move one or more optical elements such as a lens in lens system 122 within the armature 137. In other examples, the armature may have grooves or space in the area around a light processing element so it slides over the element, for example, microdisplay 120, without moving the light processing element. Another element in the armature such as the lens system 122 is attached so that the system 122 or a lens within slides or moves with the moving armature 137. The displacement range is typically on the order of a few millimeters (mm). In one example, the range is 1-2 mm. In other examples, the armature 137 may provide support to the lens system 122 for focal adjustment techniques involving adjustment of other physical parameters than displacement.

In one example, the adjuster 135 may be an actuator such as a piezoelectric motor. Other technologies for the actuator may also be used and some examples of such technologies are a voice coil formed of a coil and a permanent magnet, a magnetostriction element, and an electrostriction element.

There are different image generation technologies that can be used to implement microdisplay 120. For example, microdisplay 120 can be implemented using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, microdisplay 120 can be implemented using an emissive technology where light is generated by the display. For example, a PicoP™ engine from Microvision, Inc. emits a laser signal with a micro mirror steering either onto a tiny screen that acts as a transmissive element or beamed directly into the eye (e.g., laser).

As mentioned above, the configuration of the light processing elements of the microdisplay assembly 173 create a focal distance or focal region in which a virtual object appears in an image. Changing the configuration changes the focal region for the virtual object image. The focal region determined by the light processing elements can be determined and changed based on the equation $1/S1+1/S2=1/f$.

The symbol f represents the focal length of a lens such as lens system 122 in the microdisplay assembly 173. The lens system 122 has a front nodal point and a rear nodal point. If light rays are directed toward either nodal point at a given angle relative to the optical axis, the light rays will emerge from the other nodal point at an equivalent angle relative to the optical axis. In one example, the rear nodal point of lens system 122 would be between itself and the microdisplay 120. The distance from the rear nodal point to the microdisplay 120 may be denoted as S2. The front nodal point is typically within a few mm of lens system 122. The target location is the location of the virtual object image to be generated by the microdisplay 120 in a three-dimensional physical space. The distance from the front nodal point to the target location of the virtual image may be denoted as S1. Since the image is to be a virtual image appearing on the same side of the lens as the microdisplay 120, sign conventions give that S1 has a negative value.

If the focal length of the lens is fixed, S1 and S2 are varied to focus virtual objects at different depths. For example, an initial position may have S1 set to infinity, and S2 equal to the focal length of lens system 122. Assuming lens system 122 has a focal length of 10 mm, consider an example in which the virtual object is to be placed about 1 foot or 300 mm into the user's field of view. S1 is now about −300 mm, f is 10 mm and S2 is set currently at the initial position of the focal length, 10 mm, meaning the rear nodal point of lens system 122 is 10 mm from the microdisplay 120. The new distance or new displacement between the lens 122 and microdisplay 120 is determined based on $1/(-300)+1/S2=1/10$ with all in units of mm. The result is about 9.67 mm for S2.

In one example, the processing unit 4 can calculate the displacement values for S1 and S2, leaving the focal length f fixed and cause the control circuitry 136 to cause a variable adjuster driver 237 (see FIG. 6) to send drive signals to have the variable virtual focus adjuster 135 move the lens system 122 along the optical path 133 for example. In other embodiments, the microdisplay unit 120 may be moved instead or in addition to moving the lens system 122. In other embodiments, the focal length of at least one lens in the lens system 122 may be changed instead or with changes in the displacement along the optical path 133 as well.

FIG. 9B is a side view of an eyeglass temple in another embodiment of a mixed reality display device providing support for hardware and software components and three dimensional adjustment of a microdisplay assembly. Some of the numerals illustrated in the FIG. 5A above have been removed to avoid clutter in the drawing. In embodiments where the display optical system 14 is moved in any of three dimensions, the optical elements represented by reflecting surface 124 and the other elements of the microdisplay assembly 173, e.g. 120, 122 may also be moved for maintaining the optical path 133 of the light of a virtual image to the display optical system. An XYZ mechanism in this example made up of one or more motors represented by motor block 203 and shafts 205 under control of the processor 210 of control circuitry 136 control movement of the elements of the microdisplay assembly 173. An example of motors which may be used are piezoelectric motors. In the illustrated example, one motor is attached to the armature 137 and moves the variable focus adjuster 135 as well, and another representative motor 203 controls the movement of the reflecting element 124.

FIG. 10A is a top view of an embodiment of a movable display optical system 14 (having left and right portions 14L and 14R) of a see-through, near-eye, mixed reality device 2 including an arrangement of gaze detection elements. A portion of the frame 115 of the see-through head-mounted display 150 will surround a display optical system (e.g., 14r) and provides support for elements of an embodiment of a microdisplay assembly 173 including microdisplay 120 and its accompanying elements as illustrated. In order to show the components of the display system 14, in this case of portion 14r for the right eye system, a top portion of the frame 115 surrounding the display optical system is not depicted. Additionally, the microphone 110 in bridge 104 is not shown in this view to focus attention on the operation of the display adjustment mechanism 203. As in the example of FIG. 8C, the display optical system 14 in this embodiment is moved by moving an inner frame 117r, which in this example surrounds the microdisplay assembly 173 as well. The display adjustment mechanism is embodied in this embodiment as three axis motors 203 which attach their shafts 205 to inner frame 117r to translate the display optical system 14, which in this embodiment includes the microdisplay assembly 173, in any of three dimensions as denoted by plural-shafts symbol 205''' indicating three (3) axes of movement.

The display optical system 14 in this embodiment has an optical axis 142 and includes a see-through lens 118 allowing the user an actual direct view of the real world. In this example, the see-through lens 118 is a standard lens used in eye glasses and can be made to any prescription (including no prescription). In another embodiment, see-through lens 118 can be replaced by a variable prescription lens. In some embodiments, see-through, see-through head-mounted display 150 will include additional lenses.

The display optical system 14 further comprises representative partially reflecting surface 124b. In this embodiment, light from the microdisplay 120 is directed along optical path 133 via a partially reflective element 124b embedded in lens 118 which combines the virtual image view traveling along optical path 133 with the natural or actual direct view along the optical axis 142 so that the combined views are directed into a user's eye at the optical axis, the position with the most collimated light for a clearest view.

A detection area 139r of a light sensor is also part of the display optical system 14r. An optical element 125 embodies the detection area 139r by capturing reflected light from the user's eye received along the optical axis 142 and directs the captured light to the sensor 134r, in this example positioned in the lens 118 within the inner frame 117r. In one example, sensor 134 r is a visible light camera or a combination of RGB/IR camera, and the optical element 125 includes an optical element which reflects visible light reflected from the user's eye, for example a partially reflective mirror. In other embodiments, the sensor 134r is an IR sensitive device such as an IR camera, and the element 125 includes a hot reflecting surface which lets visible light pass through it and reflects IR radiation to the sensor 134r. Another example of an IR sensor is a position sensitive device (PSD).

The depiction of the reflecting elements 125, 124, 124a and 124b in FIGS. 10A-10D are representative of their functions. The surfaces may take any number of forms and be implemented with one or more optical components in one or more arrangements for directing light to its intended destination such as a camera sensor or a user's eye. As shown, the arrangement allows the detection area 139 of the sensor to have its center aligned with the center of the display optical system 14. The image sensor 134r captures the detection area 139, so an image captured at the image sensor is centered on the optical axis because the detection area 139 is.

When the user is looking straight ahead, and the center of the user's pupil is centered in an image captured of the user's eye when a detection area 139 or an image sensor 134r is effectively centered on the optical axis of the display, the display optical system 14r is aligned with the pupil. When both display optical systems 14 are aligned with their respective pupils, the distance between the optical centers matches or is aligned with the user's inter-pupillary distance. In the example of FIG. 6A, the inter-pupillary distance can be aligned with the display optical systems 14 in three dimensions.

In one embodiment, if the data captured by the sensor 134 indicates the pupil is not aligned with the optical axis, one or more processors in the processing unit 20 or the control circuitry 136 or both use a mapping value which correlates a distance or length measurement unit to a pixel or other discrete unit or area of the image for determining how far off the image of the pupil is from the optical axis 142. Based on the distance determined, the one or more processors determine adjustments of how much distance and in which direction the display optical system 14r is to be moved to align the optical axis 142 with the pupil. Control signals are applied by one or more display adjustment mechanism drivers 245 to each of the components, e.g. motors 203, making up one or more display adjustment mechanisms 203. In the case of motors in this example, the motors move their shafts 205 to move the inner frame 117r in at least one direction indicated by the control signals. On the temple side of the inner frame 117r are flexible sections of the frame 115 which are attached to the inner frame 117r at one end and slide within grooves 217a and 217b within the interior of the temple frame 115 to anchor the inner frame 117 to the frame 115 as the display optical system 14 is move in any of three directions for width, height or depth changes with respect to the respective pupil.

In addition to the sensor, the display optical system 14 includes other gaze detection elements. In this embodiment, attached to frame 117r on the sides of lens 118, are at least 2 but may be more, infra-red (IR) illuminating devices 153 which direct narrow infra-red light beams within a particular wavelength range at the user's eye to each generate a respective glint on a surface of the user's cornea. In other embodiments, the illuminators and any photodiodes may be on the lenses, for example at the corners or edges. In this embodiment, in addition to the at least 2 infra-red (IR) illuminating devices 153 are IR photodetectors 152. Each photodetector 152 is sensitive to IR radiation within the particular wavelength range of its corresponding IR illuminator 153 across the lens 118 and is positioned to detect a respective glint. As shown in FIGS. 6A-4C, the illuminator and photodetector are separated by a barrier 154 so that incident IR light from the illuminator 153 does not interfere with reflected IR light being received at the photodetector 152. In the case where the sensor is an IR sensor, the photodetectors 152 may not be needed or may be an additional capture source. With a visible light camera, the photodetectors 152 capture light from glints and generate glint intensity values.

In some embodiments, sensor 134r may be an IR camera which captures not only glints, but also an infra-red or near-infra-red image of the user's eye including the pupil. In other embodiments, the sensor device 134r is a position sensitive device (PSD), sometimes referred to as an optical position sensor. The position of detected light on the surface of the sensor is identified. A PSD can be selected which is sensitive to a wavelength range of IR illuminators for the glints. When light within the wavelength range of the position sensitive device is detected on the sensor or light sensitive portion of the device, an electrical signal is generated which identifies the location on the surface of the detector. In some embodiments, the surface of a PSD is divided into discrete sensors like pixels from which the location of the light can be determined. In other examples, a PSD isotropic sensor may be used in which a change in local resistance on the surface can be used to identify the location of the light spot on the PSD. Other embodiments of PSDs may also be used. By operating the illuminators 153 in a predetermined sequence, the location of the reflection of glints on the PSD can be identified and hence related back to their location on a cornea surface.

In FIGS. 10A-10D, the positions of the gaze detection elements, e.g. the detection area 139 and the illuminators 153 and photodetectors 152 are fixed with respect to the optical axis of the display optical system 14. These elements may move with the display optical system 14r, and hence its optical axis, on the inner frame, but their spatial relationship to the optical axis 142 does not change.

FIG. 10B is a top view of another embodiment of a movable display optical system of a see-through, near-eye, mixed reality device including an arrangement of gaze detection elements. In this embodiment, light sensor 134r may be embodied as a visible light camera, sometimes referred to as an RGB camera, or it may be embodied as an IR camera or a camera capable of processing light in both the visible and IR ranges, e.g. a depth camera. In this example, the image sensor 134r is the detection area 139r. The image sensor 134 of the camera is located vertically on the optical axis 142 of the display optical system. In some examples, the camera may be located on frame 115 either above or below see-through lens 118 or embedded in the lens 118. In some embodiments, the illuminators 153 provide light for the camera, and in other embodiments the camera captures images with ambient lighting. Image data captured may be used to determine alignment of the pupil with the optical axis. Gaze determination techniques based on image data, glint data or both may be used based on the geometry of the gaze detection elements.

In this example, the motor 203 in bridge 104 moves the display optical system 14r in a horizontal direction with respect to the user's eye as indicated by directional symbol 205. The flexible frame portions 215a and 215b slide within grooves 217a and 217b as the system (e.g., 14r) is moved. In this example, reflecting element 124a of a microdisplay assembly having L-shaped projection path 133 is stationery. As the IPD is typically determined once and stored, any adjustment of the focal length between the microdisplay 120 knot shown, see FIG. 9A instead) and the reflecting element 124a that may be done may be accomplished by the microdisplay assembly, for example via adjustment of the microdisplay elements within the armature 137 (not shown, see FIG. 9A instead).

Figure 10C:
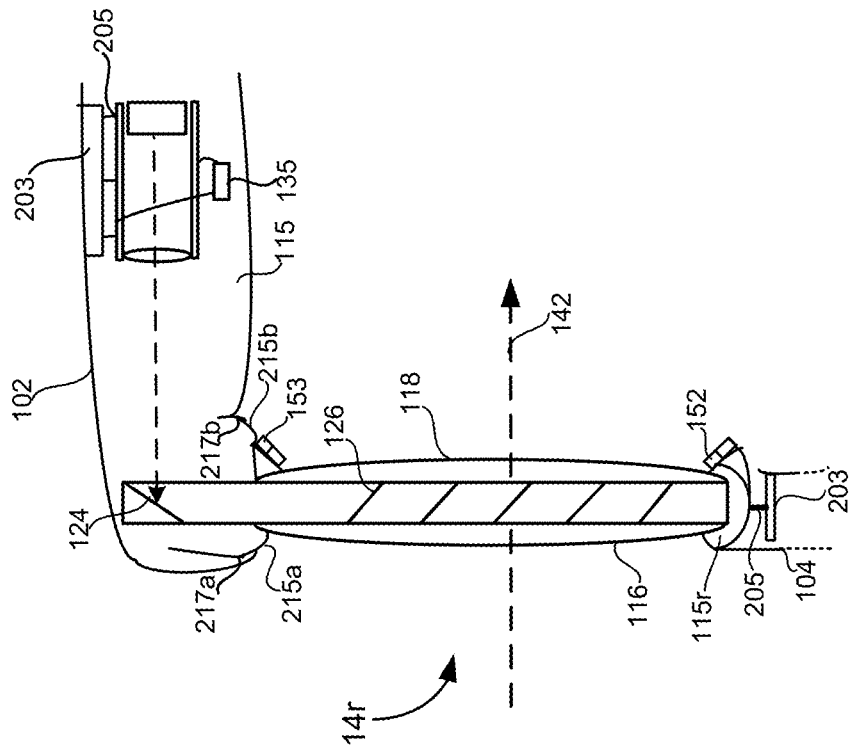
FIG. 10C is a top view of a third embodiment of a movable display optical system of a see-through, near-eye, mixed reality device including an arrangement of gaze detection elements.

FIG. 10C is a top view of a third embodiment of a movable display optical system of a see-through, near-eye, mixed reality device including an arrangement of gaze detection elements. The display optical system (e.g., 14r) has a similar arrangement of gaze detection elements including IR illuminators 153 and photodetectors 152, and a light sensor 134r located on the frame 115 or lens 118 below or above optical axis 142. In this example, the display optical system (e.g., 14r) includes a light guide optical element (126) as the partially reflective element for directing the virtual images into the user's eye and is situated between an additional see-through lens 116 and see-through lens 118. As reflecting elements 126 are within the lightguide optical element and moves with the element (126), an embodiment of a microdisplay assembly 173 is attached on the temple 102 in this example to a display adjustment mechanism 203 for the display optical system 14 embodied as a set of three axis motor 203 with shafts 205 include at least one for moving the microdisplay assembly. One or more motors 203 on the bridge 104 are representative of the other components of the display adjustment mechanism 203 which provides three axes of movement (indicated by plural shafts 205). In another embodiment, the motors may operate to only move the devices via their attached shafts 205 in the horizontal direction. The motor 203 for the microdisplay assembly 173 would also move it horizontally for maintaining alignment between the light coming out of the microdisplay 120 and the reflecting element 124. A processor 210 of the control circuitry (see FIG. 11) coordinates their movement.

Lightguide optical element 112 transmits light from microdisplay 120 to the eye of the user wearing head mounted display device 150. Lightguide optical element 112 also allows light from in front of the head mounted display device 150 to be transmitted through lightguide optical element 112 to the user's eye thereby allowing the user to have an actual direct view of the space in front of head mounted display device 150 in addition to receiving a virtual image from microdisplay 120. Thus, the walls of lightguide optical element 112 are see-through. Lightguide optical element 112 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar, substrate comprising lightguide optical element 112 by internal reflection.

After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a lightguide optical element can be found in United States Patent Application Publication 2008/0285140, Ser. No. 12/214,366, published on Nov. 20, 2008, "Substrate-Guided Optical Devices" incorporated herein by reference in its entirety. In one embodiment, each eye will have its own lightguide optical element 112. When the head mounted display device has two light guide optical elements, each eye can have its own microdisplay 120 that can display the same image in both eyes or different images in the two eyes. In another embodiment, there can be one lightguide optical element which reflects light into both eyes.

Figure 10D:
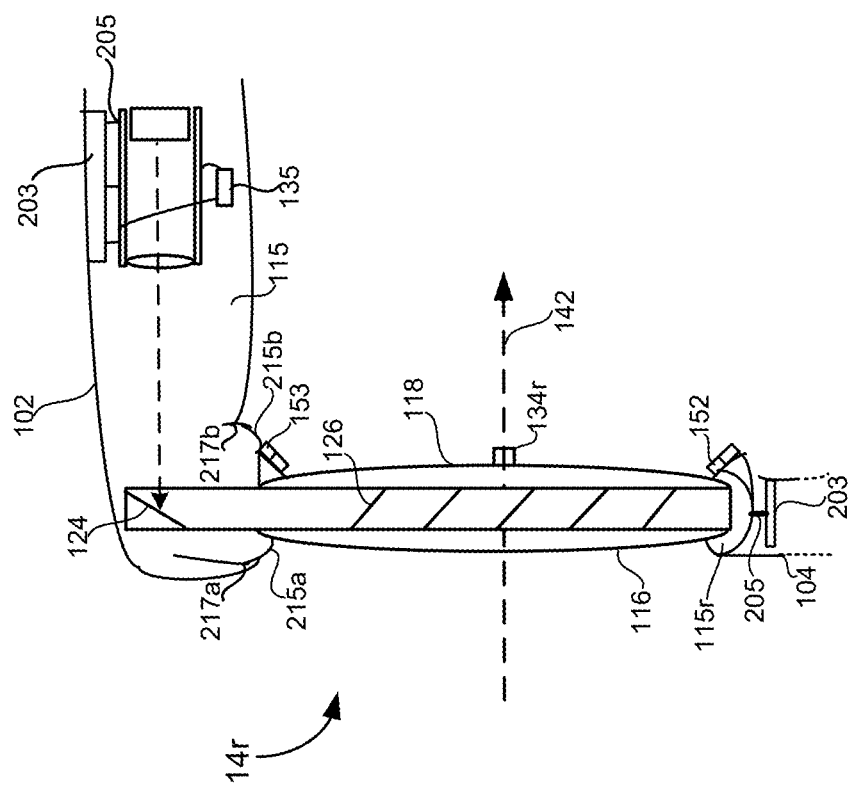
FIG. 10D is a top view of a fourth embodiment of a movable display optical system of a see-through, near-eye, mixed reality device including an arrangement of gaze detection elements.

FIG. 10D is a top view of a fourth embodiment of a movable display optical system of a see-through, near-eye, mixed reality device including an arrangement of gaze detection elements. This embodiment is similar to FIG. 6C's embodiment including a light guide optical element 112. However, the only light detectors are the IR photodetectors 152, so this embodiment relies on glint detection only for gaze detection as discussed in the examples below.

In the embodiments above, the specific number of lenses shown are just examples. Other numbers and configurations of lenses operating on the same principles may be used. Additionally, in the examples above, only the right side (e.g., 14r) of the see-through, near-eye display 2 are shown. A full near-eye, mixed reality display device would include as examples another set of lenses 116 and/or 118, another lightguide optical element (e.g., having partially reflective mirrors 126) for the embodiments of FIGS. 10C and 10D, another microdisplay 120, another lens system 122, likely another room facing camera 113, another eye tracking camera 134 for the embodiments of FIGS. 10A to 10D, earphones 130, and a temperature sensor 138.

FIG. 11 is a block diagram of one embodiment of hardware and software components of a see-through, near-eye display unit 2 as may be used with one or more embodiments. FIG. 12 is a block diagram describing the various components of a processing unit 20. In this embodiment, see-through head-mounted display 150, receive instructions about a virtual image from processing unit 20 and provides the sensor information back to processing unit 20. Software and hardware components which may be embodied in a processing unit 20, will receive the sensory information from the display device 150 and may also receive sensory information from hub computing device 12 ( ). Based on that information, processing unit 20 will determine where and when to provide a virtual image to the user and send instructions accordingly to the control circuitry 136 of the display device 150.

Note that some of the components of FIG. 11 (e.g., physical environment facing camera 113, eye camera 134, variable virtual focus adjuster 135, photodetector interface 139, micro display 120, illumination device 153 or illuminators, earphones 130, temperature sensor 138, display adjustment mechanism 203) are shown in shadow to indicate that there are two of each of those devices, one for the left side and one for the right side of head mounted display device 150. FIG. 6 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230. In one embodiment, all of components of control circuit 220 are in communication with each other via dedicated lines of one or more buses. In another embodiment, each of the components of control circuit 200 are in communication with processor 210.

Camera interface 216 provides an interface to the two physical environment facing cameras 113 and each eye camera 134 and stores respective images received from the cameras 113, 134 in camera buffer 218. Display driver 220 will drive microdisplay 120. Display formatter 222 may provide information, about the virtual image being displayed on microdisplay 120 to one or more processors of one or more computer systems, e.g. 20, 12, 210 performing processing for the augmented reality system. Timing generator 226 is used to provide timing data for the system. Display out 228 is a buffer for providing images from physical environment facing cameras 113 and the eye cameras 134 to the processing unit 4. Display in 230 is a buffer for receiving images such as a virtual image to be displayed on microdisplay 120. Display out 228 and display in 230 communicate with band interface 232 which is an interface to processing unit 4.

Power management circuit 202 includes voltage regulator 234, eye tracking illumination driver 236, variable adjuster driver 237, photodetector interface 239, audio DAC and amplifier 238, microphone preamplifier and audio ADC 240, temperature sensor interface 242, display adjustment mechanism driver(s) 245 and clock generator 244. Voltage regulator 234 receives power from processing unit 4 via band interface 232 and provides that power to the other components of head mounted display device 150. Illumination driver 236 provides the IR lightsource for illumination devices 153, as described above. Audio DAC and amplifier 238 receives the audio information from earphones 130. Microphone preamplifier and audio ADC 240 provides an interface for microphone 110. Temperature sensor interface 242 is an interface for temperature sensor 138. One or more display adjustment drivers 245 provide control signals to one or more motors or other devices making up each display adjustment mechanism 203 indicating which represent adjustment amounts of movement in at least one of three directions. Power management unit 202 also provides power and receives data back from three axis magnetometer 132A, three axis gyro 132B and three axis accelerometer 132C.

The variable adjuster driver 237 provides a control signal, for example a drive current or a drive voltage, to the adjuster 135 to move one or more elements of the microdisplay assembly 173 to achieve a displacement for a focal region calculated by software executing in the processing unit 4 or the hub computer 12 or both. In embodiments of sweeping through a range of displacements and, hence, a range of focal regions, the variable adjuster driver 237 receives timing signals from the timing generator 226, or alternatively, the clock generator 244 to operate at a programmed rate or frequency.

The photodetector interface 239 receives performs any analog to digital conversion needed for voltage or current readings from each photodetector, stores the readings in a processor readable format in memory via the memory controller 212, and monitors the operation parameters of the photodetectors 152 such as temperature and wavelength accuracy.

FIG. 12 is a block diagram of one embodiment of the hardware and software components of a processing unit 4 associated with a see-through, near-eye display unit. The mobile device 5 may include this embodiment of hardware and software components as well or similar components which perform similar functions. FIG. 12 shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with see-through, see-through head-mounted display 150 via band interface 302 and band interface 232, display in buffer 338 in communication with see-through head-mounted display 150 via band interface 302 and band interface 232, microphone interface 340 in communication with an external microphone connector 342 for connecting to a microphone, PCI express interface for connecting to a wireless communication device 346, and USB port(s) 348.

In one embodiment, wireless communication component 346 can include a Wi-Fi enabled communication device, Bluetooth communication device, infrared communication device, etc. The USB port can be used to dock the processing unit 4 to hub computing device 12 in order to load data or software onto processing unit 20 as well as charge processing unit 4. In one embodiment, CPU 320 and GPU 322 are the main workhorses for determining where, when and how to insert images into the view of the user.

Power management circuit 306 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 150.

The figures above provide examples of geometries of elements for a display optical system which provide a basis for different methods of determining an IPD as discussed in the following figures. The method embodiments may refer to elements of the systems and structures above for illustrative context; however, the method embodiments may operate in system or structural embodiments other than those described above.

Figure 13:
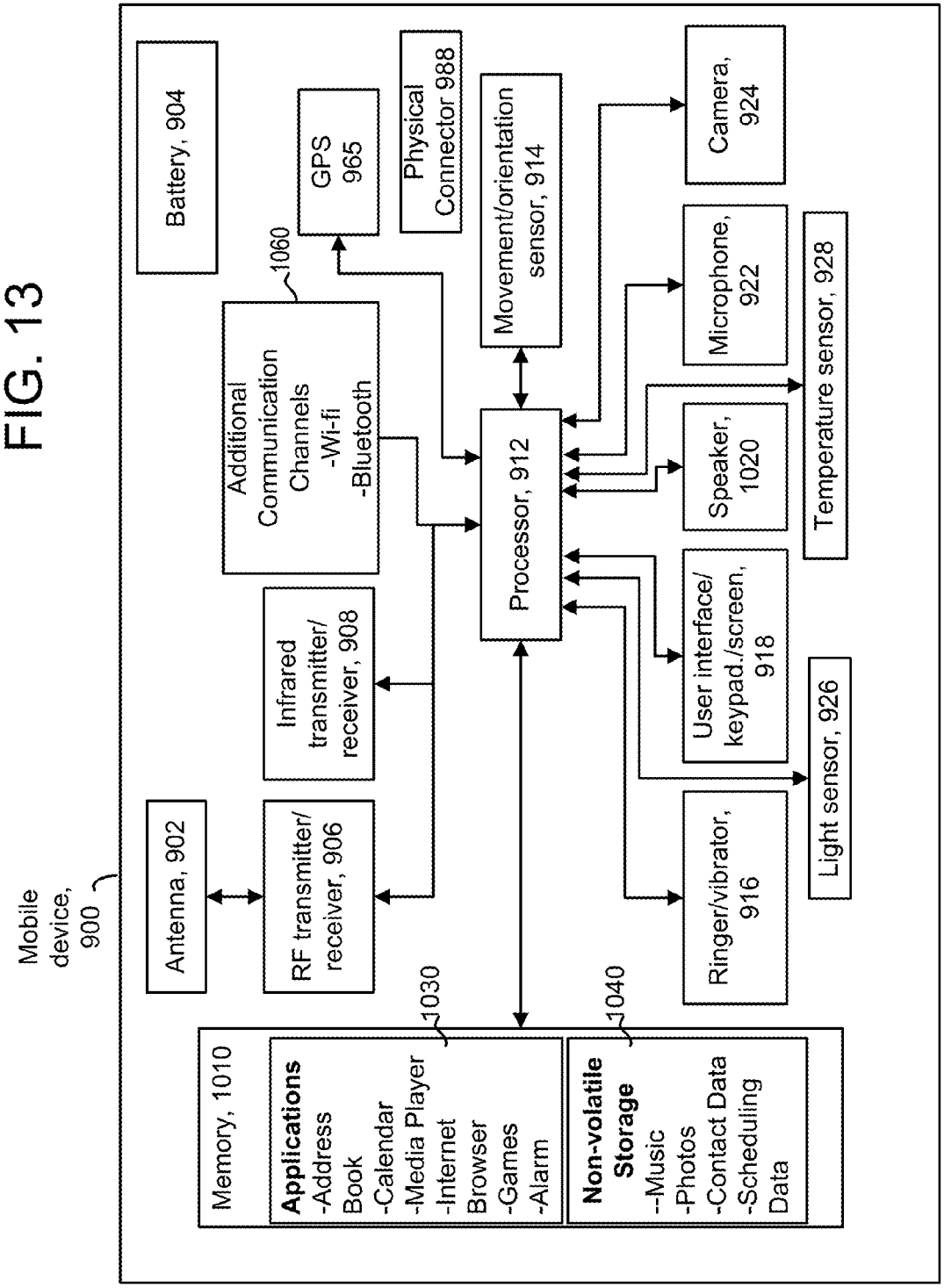
FIG. 13 is a block diagram of an exemplary mobile device which may operate in embodiments of the technology.

FIG. 13 is a block diagram of an exemplary mobile device which may operate in embodiments of the technology. Exemplary electronic circuitry of a typical mobile phone is depicted. The phone 900 includes one or more microprocessors 912, and memory 1010 (e.g., non-volatile memory such as ROM and volatile memory such as RAM) which stores processor-readable code which is executed by one or more processors of the control processor 912 to implement the functionality described herein.

Mobile device 900 may include, for example, processors 912, memory 1010 including applications and non-volatile storage. The processor 912 can implement communications, as well as any number of applications, including the interaction applications discussed herein. Memory 1010 can be any variety of memory storage media types, including non-volatile and volatile memory. A device operating system handles the different operations of the mobile device 900 and may contain user interfaces for operations, such as placing and receiving phone calls, text messaging, checking voicemail, and the like. The applications 1030 can be any assortment of programs, such as a camera application for photos and/or videos, an address book, a calendar application, a media player, an internet browser, games, other multimedia applications, an alarm application, other third party applications, the interaction application discussed herein, and the like. The non-volatile storage component 1040 in memory 1010 contains data such as web caches, music, photos, contact data, scheduling data, and other files.

The processor 912 also communicates with RF transmit/receive circuitry 906 which in turn is coupled to an antenna 902, with an infrared transmitted/receiver 908, with any additional communication channels 1060 like Wi-Fi or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a microelectromechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen, biometric sensor system 918, a speaker 1020, a microphone 922, a camera 924, a light sensor 926 and a temperature sensor 928.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 1020 while other received data signals are also processed appropriately.

Additionally, a physical connector 988 can be used to connect the mobile device 900 to an external power source, such as an AC adapter or powered docking station. The physical connector 988 can also be used as a data connection to a computing device. The data connection allows for operations such as synchronizing mobile device data with the computing data on another device.

A GPS receiver 965 utilizing satellite-based radio navigation to relay the position of the user applications is enabled for such service.

The example computer systems illustrated in the figures include examples of computer readable storage media. Computer readable storage media are also processor readable storage media. Such media may include volatile and nonvolatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

Figure 14:
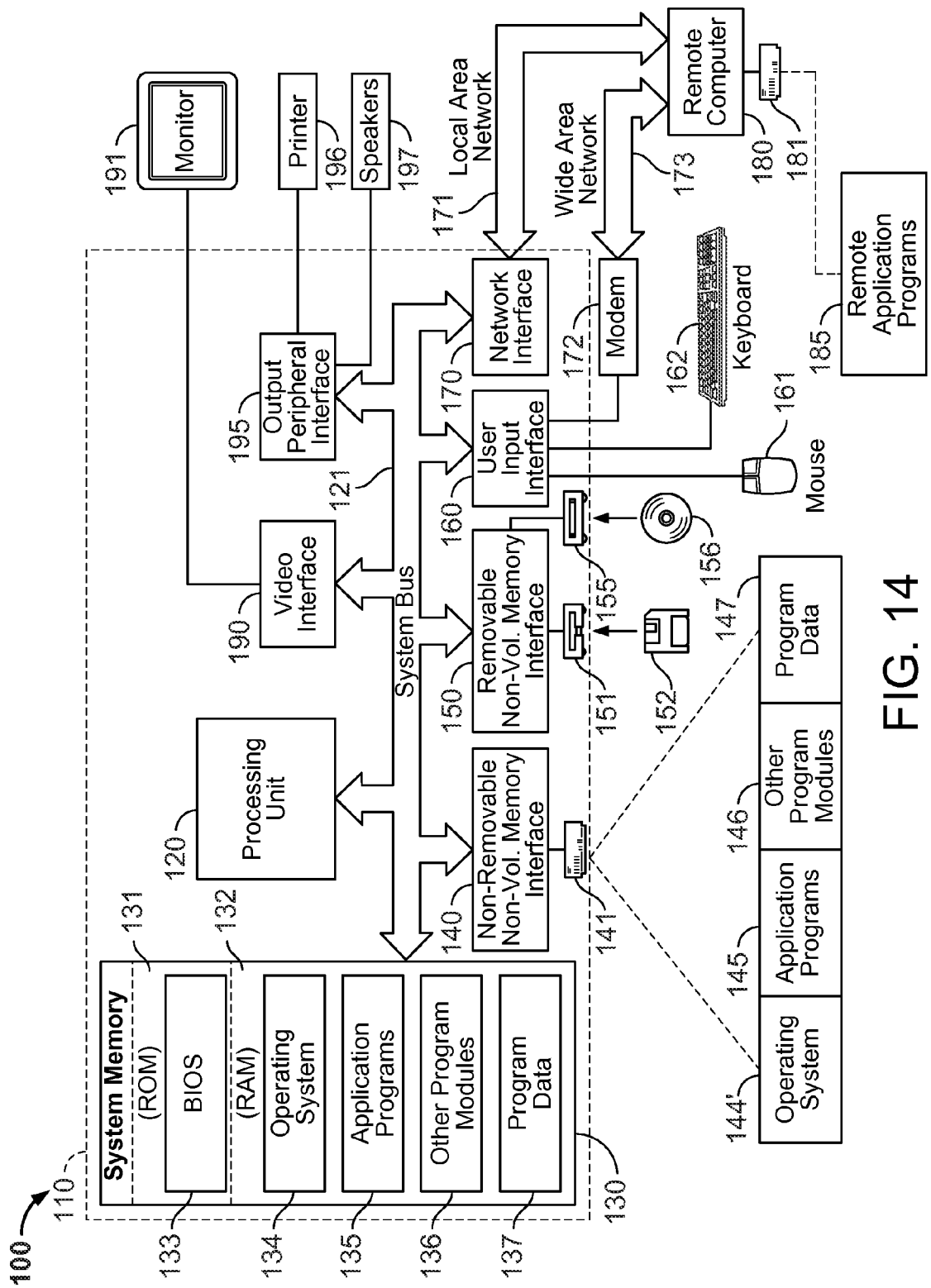
FIG. 14 is a block diagram of one embodiment of a computing system that can be used to implement a hub computing system.

FIG. 14 illustrates an example of a suitable computing system environment 100 such as personal computer.

With reference to FIG. 14, an exemplary system for implementing the technology includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 14 illustrates operating system 144', application programs 145, other program modules 146, and program data 147.

The computer 110 may also include other removable/non-removable, volatile/nonvolatile computer storage media. By way of example only, FIG. 14 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 14, provide storage of computer readable instructions, data structures, program modules and other data for the computer 110. In FIG. 14, for example, hard disk drive 141 is illustrated as storing operating system 144', application programs 145, other program modules 146, and program data 147. Note that these components can either be the same as or different from operating system 134, application programs 135, other program modules 136, and program data 137. Operating system 144', application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 14. The logical connections depicted in FIG. 14 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 14 illustrates remote application programs 185 as residing on memory device 181. It will be appreciated that the network connections shown are exemplary and other means of establishing a communications link between the computers may be used.

The computing system environment 100 is only one example of a suitable computing environment and is not intended to suggest any limitation as to the scope of use or functionality of the technology. Neither should the computing environment 100 be interpreted as having any dependency or requirement relating to any one or combination of components illustrated in the exemplary operating environment 100.

The technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing user-customized augmented reality experiences for a user of a see-through head-mounted display (HMD) device, the method comprising:

obtaining, with use of at least a first of a plurality of eye-facing cameras disposed on a frame of the HMD device, captured imagery of an iris of at least one eye faced by the at least first eye-facing camera while the at least one eye is gazing at a predetermined detection area of a see-through portion of the HMD device, the first eye-facing camera being aligned to center on the iris of the at least one eye while the at least one eye is gazing at the predetermined detection area, the first eye-facing camera being configured to detect a direction of gaze of the at least one eye, the HMD device having for each eye a respective see-through display optical system, the first eye-facing camera being configured to generate image data of the captured imagery of the iris of the at least one eye;

determining a pattern in the captured image data of the iris of the at least one eye;

using the determined pattern to identify the user and to find an associated user profile containing user preferences of the user, the user preferences including user device physical settings; and operating the see-through head-mounted display device so as to provide augmented reality experiences to the user that are customized based on the user preferences in the found user profile.

2. The method of claim 1 wherein:
the captured imagery of the iris of the at least one eye includes infrared (IR) imagery; and
the determining of the pattern in the captured image data of the iris comprises detecting a pupil region in the captured image data of the iris, determining location of an iris annulus portion surrounding the detected pupil region; and using only the determined location of the iris annulus portion for generating the pattern.

3. The method of claim 1 wherein each of the respective display optical systems of the respective eyes includes at least one movable element and the operating of the see-through head-mounted display device includes:
customized moving of one or more of the elements of the display optical systems to pre-determined positions in accordance with user preferences in the found user profile.

4. The method of claim 3 wherein the found user profile contains inter-pupillary distance (IPD) adjustment data and wherein said step of operating the see-through head-mounted display device includes manipulating the display optical systems to thereby align a respective optical axis of each user eye relative to the respective see-through, near-eye, mixed reality display portion of the display device.

5. The method of claim 4 wherein the IPD adjustment data includes data to position respective elements of the respective display optical systems in three dimensions.

6. The method of claim 1 further including the step of:
if an associated user profile is not found, generating a user profile for the user based on the determined pattern.

7. The method of claim 2 wherein:
if an associated user profile is not found, a new user profile is generated for the user based on the determined pattern; and
the step of generating the new user profile includes the steps of:
determining a pupil position difference between the pupil region position identified in the captured image data and a respective optical axis position in a horizontal direction and a vertical direction;
automatically determining at least one adjustment value for at least one display adjustment mechanism based on the pupil position difference; and
storing the adjustment value in the generated new user profile.

8. The method of claim 1 wherein the step of associating includes calculating a match between a pattern detected in the image and a pattern associated with a stored user profile.

9. The method of claim 1 wherein the found user profile includes two or more of:
respective augmented reality service user preferences of the identified user for respective ones of plural augmented reality services; display adjustment data for the identified user; and
augmented reality information filters for different types of contents that are presentable to the identified user.

10. A system including a see-through, near-eye, mixed reality display device, the system comprising:
for each of left and right eye portions of the see-through, near-eye, mixed reality display device, a respective display optical system, each display optical system having an optical axis and being positioned to be seen through by a respective eye and including a respective movable support structure for supporting one or more optical elements of each display optical system;
the display optical system of each of the left and right eye portions including at least one eye-facing camera that is configured to generate eye imagery data including iris imagery data from captured reflected light from the respective eye while the respective eye gazes through a predetermined detection area of the see-through portion of the corresponding display optical system at a real object disposed beyond the display device, where the at least one eye-facing camera is aligned to center on the iris of the respective eye while the respective eye is gazing at the predetermined detection area;
a processor including code configured to cause the processor to operate the respective at least one eye-facing camera for each eye to generate its corresponding eye imagery data while the corresponding eye gazes through the corresponding display optical system at the predetermined detection area, and configured to cause the processor to determine a user identity based on an evaluation of the generated eye imagery data of at least one eye of the user by comparing an iris recognition pattern based on a user iris to a datastore of user iris recognition patterns associated with pre-stored user profiles, and to determine whether a match exists between the iris recognition pattern and a user identity and a correspondingly stored user profile; and
at least one display adjustment mechanism connected to the respective movable support structure for moving at least one movable support structure in accordance with one or more position adjustment values.

11. The system of claim 10 wherein the system further includes code instructing the processor to:
retrieve from the correspondingly stored user profile of the identified user, said at least one or more position adjustment values for the movable support structure; and
move the at least one moveable support structure in accordance with the one or more elements of the display optical system to a pre-determined characteristic defining an inter-pupillary distance for the user.

12. The system of claim 11 wherein said at least one or more position adjustment values includes data to position the display optical system in three dimensions.

13. The system of claim 11 wherein the system further includes code instructing the processor to determine whether a user profile exists for a user and if a user profile does not exist, generate a user profile.

14. The system of claim 11 wherein the system further includes code instructing the processor to determine a pupil position difference between a pupil position identified in captured data and a respective eye optical axis position in a horizontal direction and a vertical direction;
automatically determining the at least one adjustment value for at least one display adjustment mechanism based on the pupil position difference; and store the adjustment value in the user profile.

15. The system of claim 11 wherein the user profile includes one or more of: augmented reality service user preferences; user inter-pupillary distance (IPD) adjustment data; augmented reality information filters.

16. A method for providing adjustments to a worn see-through, near-eye, mixed reality display device for alignment of an optical axis of a respective display optical system for each eye of a user, the method comprising:
for each of left and right eyes of the user, and with use of a respective eye-facing camera disposed on a frame of the mixed reality display device and aimed to center on an iris of the respective eye when the eye is gazing at a respective predetermined detection area for the eye and on the device, determining a pupil position difference between a pupil position identified in currently captured data and a respective eye optical axis position in a horizontal direction and a vertical direction;

using at least one of the eye-facing cameras to capture an image of the corresponding iris when the respective eye of the user is gazing at the respective predetermined detection area of the eye to generate image data of the respective eye;

determining a pattern in the generated image data of an iris of at least one eye;

associating user profile information with the user based on the determined pattern to thus identify the user;

based on a predetermined inter-pupillary distance included in the associated user profile of the user and based on a currently determined pupil position difference, automatically determining at least one adjustment value for at least one display adjustment mechanism provided within the see-through, near-eye, mixed reality display device; and adjusting the at least one display adjustment mechanism in accordance with the at least one determined adjustment value.

17. The method of claim 16 wherein the user profile includes one or more of: augmented reality service user preferences; user inter-pupillary distance adjustment data; augmented reality information filters.

18. The method of claim 17 further including operating the see-through, near-eye, mixed reality display device to provide augmented reality images to the user based on the user preferences in the user profile.

19. The method of claim 2 wherein the utilized eye-facing cameras are each a combination of an RGB and an IR camera.

20. The method of claim 10 wherein the operated eye-facing cameras are each a combination of an RGB and an IR camera.

* * * * *